US008212803B2

(12) United States Patent
Hong et al.

(10) Patent No.: US 8,212,803 B2
(45) Date of Patent: Jul. 3, 2012

(54) LIQUID CRYSTAL DISPLAY AND METHOD OF DRIVING THE SAME

(75) Inventors: Jincheol Hong, Paju-si (KR); Seungcheol Oh, Goyang-si (KR); Changhun Cho, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 554 days.

(21) Appl. No.: 12/554,763

(22) Filed: Sep. 4, 2009

(65) Prior Publication Data

US 2010/0156879 A1 Jun. 24, 2010

(30) Foreign Application Priority Data

Dec. 23, 2008 (KR) ........................ 10-2008-0132479

(51) Int. Cl.
*G06F 3/038* (2006.01)

(52) U.S. Cl. ........................... 345/213; 345/87; 345/691

(58) Field of Classification Search ........................ None
See application file for complete search history.

(56) References Cited

U.S. PATENT DOCUMENTS

2006/0007249 A1 * 1/2006 Reddy et al. .................. 345/690
2008/0062105 A1 * 3/2008 Han et al. ......................... 345/90

* cited by examiner

*Primary Examiner* — Muhammad N Edun
(74) *Attorney, Agent, or Firm* — Birch, Stewart, Kolasch & Birch, LLP

(57) ABSTRACT

A liquid crystal display and a method of driving the same are provided. The liquid crystal display includes a first source drive IC group outputting a first feedback lock signal in response to one of a power voltage input through a first lock signal input terminal and a lock signal from the timing controller, a second source drive IC group outputting a second feedback lock signal in response to one of the power voltage input through a second lock signal input terminal, the lock signal from the timing controller, and a lock signal transferred from the first source drive IC group, and a comparator that compares the first feedback lock signal with the second feedback lock signal and supplies a comparison result to the timing controller.

17 Claims, 26 Drawing Sheets

21

FIG. 14

| Data Bit | CLK | D1~D10 | D11~D15 | DE_DUM | DE | D16~D20 | D21~D30 |
|---|---|---|---|---|---|---|---|
| Format | Clock | R_data[0:9] | G_data[0:4] | DUMMY | Data Enable | G_data[5:9] | B_data[0:9] |
| | Clock | Control Data (C1~C15) | | DUMMY | Data Enable | Control Data (C18~C32) | |

FIG. 15

| Items | C0 | C1 | C2 | C3 | C12~C11 | C12 | C13~C14 | C15 | C16 | C17 | C18~C32 |
|---|---|---|---|---|---|---|---|---|---|---|---|
| Dummy source control packet Cf, Cb | H | L | L | L | Assigned | L | Assigned | H | H | L | |
| Real source control packet Cr | H | H | H | L | Assigned | L | Assigned | H | H | L | |
| Last dummy source control packet Cl | H | L | L | L | Assigned | L | Assigned | H | L | H | |
| Control signal Mapping | CLK | SOE | | | SOE PRD | | POL | | DE | | |

FIG. 16

| | C0 | C1 | C2 | C3 | C4~C11 | C12 | C13~C14 | C15 | C16 | C17 | C18~C32 |
|---|---|---|---|---|---|---|---|---|---|---|---|
| Control Packet | H | Reserved | | L | Reserved | L | Assigned | H | Reserved | | |
| | CLK | SOE | | | | | POL | | DE | | |

| SCLK Number | C1 C2 |
|---|---|
| SCLK#1 | H H |
| SCLK#2 | H H |
| SCLK#3 | H H |
| SCLK#4 | H L |
| SCLK#5 | H L |
| SCLK#6 | H L |
| SCLK#7 | H L |
| SCLK#8 | H L |
| SCLK#9 | H L |
| SCLK#10 | H L |
| SCLK#11 | H L |
| SCLK#12 | H L |
| SCLK#13 | H L |
| SCLK#14 | H L |
| SCLK#15 | H L |
| SCLK#16 | H L |

| SCLK Number | C1 C2 |
|---|---|
| SCLK#1 | H H |
| SCLK#2 | H H |
| SCLK#3 | H H |
| SCLK#4 | H H |
| SCLK#5 | H H |
| SCLK#6 | H H |
| SCLK#7 | H H |
| SCLK#8 | H L |
| SCLK#9 | H L |
| SCLK#10 | H L |
| SCLK#11 | H L |
| SCLK#12 | H L |
| SCLK#13 | H L |
| SCLK#14 | H L |
| SCLK#15 | H L |
| SCLK#16 | H L |

| SCLK Number | C1 C2 |
|---|---|
| SCLK#1 | H H |
| SCLK#2 | H H |
| SCLK#3 | H H |
| SCLK#4 | H H |
| SCLK#5 | H H |
| SCLK#6 | H H |
| SCLK#7 | H H |
| SCLK#8 | H H |
| SCLK#9 | H H |
| SCLK#10 | H H |
| SCLK#11 | H H |
| SCLK#12 | H L |
| SCLK#13 | H L |
| SCLK#14 | H L |
| SCLK#15 | H L |
| SCLK#16 | H L |

LIQUID CRYSTAL DISPLAY AND METHOD OF DRIVING THE SAME

This application claims the benefit of Korea Patent Application No. 10-2008-0132479 filed on Dec. 23, 2008, which is incorporated herein by reference for all purposes as if fully set forth herein.

BACKGROUND OF THE INVENTION

1. Field of the Invention

Embodiments of the inventions relate to a liquid crystal display and a method of driving the same.

2. Discussion of the Related Art

Active matrix type liquid crystal displays display a moving picture using a thin film transistor (TFT) as a switching element. The active matrix type liquid crystal displays have been implemented in televisions as well as display devices in portable devices, such as office equipment and computers, because of the thin profile of an active matrix type liquid crystal displays. Accordingly, cathode ray tubes (CRT) are being rapidly replaced by the active matrix type liquid crystal displays.

A liquid crystal display includes a plurality of source drive integrated circuits (ICs) supplying a data voltage to data lines of a liquid crystal display panel, a plurality of gate drive ICs sequentially supplying a gate pulse (i.e., a scan pulse) to gate lines of the liquid crystal display panel, and a timing controller controlling the source drive ICs and the gate drive ICs. In the liquid crystal display, digital video data is input to the timing controller through an interface.

The timing controller supplies the digital video data, a clock for sampling the digital video data, a control signal for controlling an operation of the source drive ICs, and the like to the source drive ICs through an interface such as a mini low-voltage differential signaling (LVDS) interface. The source drive ICs deserializes the digital video data serially input from the timing controller to output parallel data and then converts the parallel data into an analog data voltage using a gamma compensation voltage to supply the analog data voltage to the data lines.

The timing controller supplies necessary signals to the source drive ICs using a multi-drop manner of commonly applying the clock and the digital video data to the source drive ICs. Because the source drive ICs are cascade-connected to one another, the source drive ICs sequentially sample the digital video data and then simultaneously output data voltages corresponding to 1 line. In such a data transfer method, many lines such as R, G, and B data transfer lines, control lines for controlling outputs of the source drive ICs and an operation timing of a polarity change of the source drive ICs, and clock transfer lines are necessary between the timing controller and the source drive ICs. Because the mini LVDS interface is a manner of transferring each of the digital video data and the clock in the form of a pair of differential signals, which are out of phase with each other, at least 14 data transfer lines between the timing controller and the source drive ICs are necessary to simultaneously transfer odd data and even data. Accordingly, because many data transfer lines have to be formed on a printed circuit board (PCB) positioned between the timing controller and the source drive ICs, it is difficult to reduce the number of data transfer lines.

SUMMARY OF THE INVENTION

Embodiments of the inventions provide a liquid crystal display and a method of driving the same capable of reducing the number of signal transfer lines between a timing controller and source drive integrated circuits (ICs).

In one aspect, there is a liquid crystal display comprising a timing controller, a first source drive integrated circuit (IC) group that outputs a first feedback lock signal in response to one of a power voltage input through a first lock signal input terminal and a lock signal from the timing controller, a second source drive IC group that outputs a second feedback lock signal in response to one of the power voltage input through a second lock signal input terminal, the lock signal from the timing controller, and a lock signal transferred from the first source drive IC group, N pairs of data bus lines that connect the timing controller to the first and second source drive IC groups in a point-to-point manner, where N is an even number equal to or greater than 2, and a comparator that compares the first feedback lock signal with the second feedback lock signal and supplies a comparison result to the timing controller.

Each of the first and second source drive IC groups includes N/2 source drive ICs, where N is an even number equal to or greater than 2.

The liquid crystal display further comprises a lock check line used to transfer the lock signal from the timing controller to a first source drive IC of the first source drive IC group and a last source drive IC of the second source drive IC group, a first feedback lock check line used to supply the first feedback lock signal output from a last source drive IC of the first source drive IC group to the comparator, and a second feedback lock check line used to supply the second feedback lock signal output from a first source drive IC of the second source drive IC group to the comparator.

The timing controller transfers a preamble signal, in which a plurality of bits having a high logic level are successively arranged and then a plurality of bits having a low logic level are successively arranged, to each of the N source drive ICs of the first and second source drive IC groups through each of the N pairs of data bus lines. If the first and second feedback lock signals are input to the timing controller, the timing controller transfers at least one of source control data and RGB data to each of the N source drive ICs through each of the N pairs of data bus lines.

The N source drive ICs lock internal clock pulses in response to the preamble signal and then transfer a lock signal to the next source drive IC. Each of the N source drive ICs receives at least one of the source control data and the RGB data from the timing controller.

The first source drive IC group includes a first source drive IC that receives the power voltage, restores a reference clock from the preamble signal, and generates a lock signal if a phase of an internal clock pulse output from the first source drive IC is locked based on the reference clock, a second source drive IC that receives the lock signal from the first source drive IC, restores a reference clock from the preamble signal, and generates a lock signal if a phase of an internal clock pulse output from the second source drive IC is locked based on the reference clock, a third source drive IC that receives the lock signal from the second source drive IC, restores a reference clock from the preamble signal, and generates a lock signal if a phase of an internal clock pulse output from the third source drive IC is locked based on the reference clock, and a fourth source drive IC that receives the lock signal from the third source drive IC, restores a reference clock from the preamble signal, generates a lock signal if a phase of an internal clock pulse output from the fourth source drive IC is locked based on the reference clock, and supplies the lock signal to a first input terminal of the comparator.

The second source drive IC group includes an eighth source drive IC that receives the power voltage, restores a reference clock from the preamble signal, and generates a lock signal if a phase of an internal clock pulse output from the eighth source drive IC is locked based on the reference clock, a seventh source drive IC that receives the lock signal from the eighth source drive IC, restores a reference clock from the preamble signal, and generates a lock signal if a phase of an internal clock pulse output from the seventh source drive IC is locked based on the reference clock, a sixth source drive IC that receives the lock signal from the seventh source drive IC, restores a reference clock from the preamble signal, and generates a lock signal if a phase of an internal clock pulse output from the sixth source drive IC is locked based on the reference clock, and a fifth source drive IC that receives the lock signal from the sixth source drive IC, restores a reference clock from the preamble signal, generates a lock signal if a phase of an internal clock pulse output from the fifth source drive IC is locked based on the reference clock, and supplies the lock signal to a second input terminal of the comparator.

The first source drive IC group includes a first source drive IC that receives the lock signal from the timing controller, restores a reference clock from the preamble signal, and generates a lock signal if a phase of an internal clock pulse output from the first source drive IC is locked based on the reference clock, a second source drive IC that receives the lock signal from the first source drive IC, restores a reference clock from the preamble signal, and generates a lock signal if a phase of an internal clock pulse output from the second source drive IC is locked based on the reference clock, a third source drive IC that receives the lock signal from the second source drive IC, restores a reference clock from the preamble signal, and generates a lock signal if a phase of an internal clock pulse output from the third source drive IC is locked based on the reference clock, and a fourth source drive IC that receives the lock signal from the third source drive IC, restores a reference clock from the preamble signal, generates a lock signal if a phase of an internal clock pulse output from the fourth source drive IC is locked based on the reference clock, and supplies the lock signal to a first input terminal of the comparator.

The second source drive IC group includes an eighth source drive IC that receives the lock signal from the timing controller, restores a reference clock from the preamble signal, and generates a lock signal if a phase of an internal clock pulse output from the eighth source drive IC is locked based on the reference clock, a seventh source drive IC that receives the lock signal from the eighth source drive IC, restores a reference clock from the preamble signal, and generates a lock signal if a phase of an internal clock pulse output from the seventh source drive IC is locked based on the reference clock, a sixth source drive IC that receives the lock signal from the seventh source drive IC, restores a reference clock from the preamble signal, and generates a lock signal if a phase of an internal clock pulse output from the sixth source drive IC is locked based on the reference clock, and a fifth source drive IC that receives the lock signal from the sixth source drive IC, restores a reference clock from the preamble signal, generates a lock signal if a phase of an internal clock pulse output from the fifth source drive IC is locked based on the reference clock, and supplies the lock signal to a second input terminal of the comparator.

The comparator includes an AND gate.

If the first and second feedback lock signals are input to the timing controller, the timing controller simultaneously transfers at least one source control packet including the source control data to the N source drive ICs through the N pairs of data bus lines and then simultaneously transfers at least one RGB data packet including the RGB data to the N source drive ICs through the N pairs of data bus lines.

Each of the N source drive ICs generates a polarity control signal and a source output enable signal from the source control packet depending on internal clock pulses, restores the RGB data from the RGB data packet, and converts the RGB data into a positive or negative data voltage in response to the polarity control signal to output the positive/negative data voltage in response to the source output enable signal.

The RGB data packet successively includes clock bits, first RGB data bits, internal data enable clock bits, and second RGB data bits in the order named.

The timing controller supplies a second source control packet to each of the N source drive ICs through each of the N pairs of data bus lines. The second source control packet includes at least one of PWRC1/2 option information determining an amplification ratio of an output buffer of each of the N source drive ICs, MODE option information determining an output of a charge share voltage of each of the N source drive ICs, SOE_EN option information determining a receiving path of the source output enable signal, PACK_EN option information determining a receiving path of the polarity control signal, CHMODE option information determining the number of output channels of the N source drive ICs, CID1/2 option information that gives a chip identification code to each of the N source drive ICs to independently control the N source drive ICs, and H__2DOT option information determining a horizontal polarity cycle of the positive/negative data voltage output from the N source drive ICs.

In another aspect, there is a method of driving a liquid crystal display comprising supplying one of a power voltage and a lock signal generated from a timing controller to a first source drive integrated circuit (IC) group to generate a first feedback lock signal from the first source drive IC group, supplying one of the power voltage, the lock signal generated from the timing controller, and a lock signal transferred from the first source drive IC group to a second source drive IC group to generate a second feedback lock signal from the second source drive IC group; and comparing the first feedback lock signal with the second feedback lock signal to supply a comparison result to the timing controller.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 14 illustrates an example of a data mapping table of a source control packet and an RGB data packet;

FIG. 15 illustrates an example of a data mapping table of a dummy source control packet, a real source control packet, and a last dummy source control packet;

FIG. 16 illustrates an example of a data mapping table of a real source control packet;

DETAILED DESCRIPTION OF THE EMBODIMENTS

Reference will now be made in detail embodiments of the invention examples of which are illustrated in the accompanying drawings.

Figure 1:
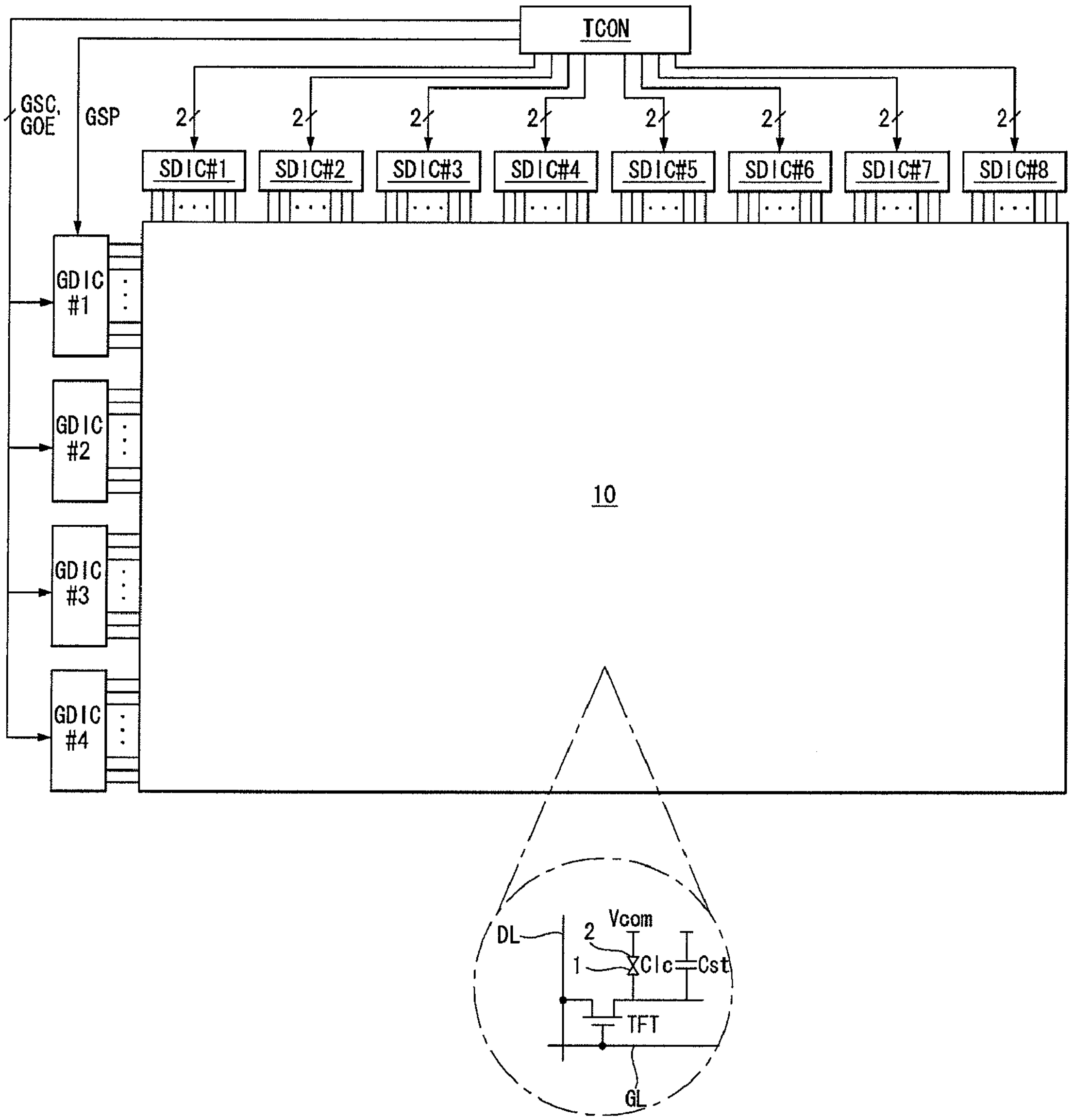
FIG. 1 is a block diagram illustrating a liquid crystal display according to an embodiment of the invention.

As shown in FIG. 1, a liquid crystal display according to an embodiment of the invention includes a liquid crystal display panel 10, a timing controller TCON, a plurality of source drive integrated circuits (ICs) SDIC#1 to SDIC#8, and a plurality of gate drive ICs GDIC#1 to GDIC#4.

The liquid crystal display panel 10 includes an upper glass substrate, a lower glass substrate, and a liquid crystal layer between the upper and lower glass substrates. The liquid crystal display panel 10 includes m×n liquid crystal cells Clc arranged at each of crossings of m data lines DL and n gate lines GL in a matrix format.

A pixel array including the data lines DL, the gate lines GL, thin film transistors (TFTs), a storage capacitor Cst, etc. is formed on the lower glass substrate of the liquid crystal display panel 10. Each of the liquid crystal cells Clc is driven by an electric field between a pixel electrode 1 receiving a data voltage through the TFT and a common electrode 2 receiving a common voltage Vcom. In each of the TFTs, a gate electrode is connected to the gate line GL, a source electrode is connected to the data line DL, and a drain electrode is connected to the pixel electrode 1 of the liquid crystal cell Clc. The TFT is turned on when a gate pulse is supplied through the gate line GL, and thus supplies a positive or negative analog video data voltage received through the data line DL to the pixel electrode 1 of the liquid crystal cell Clc.

A black matrix, a color filter, the common electrode 2, etc, are formed on the upper glass substrate of the liquid crystal display panel 10.

The common electrode 2 is formed on the upper glass substrate in a vertical electric drive manner, such as a twisted nematic (TN) mode and a vertical alignment (VA) mode. The common electrode 2 and the pixel electrode 1 are formed on the lower glass substrate in a horizontal electric drive manner, such as an in-plane switching (IPS) mode and a fringe field switching (FFS) mode.

Polarizing plates are respectively attached to the upper and lower glass substrates of the liquid crystal display panel 10. Alignment layers for setting a pre-tilt angle are respectively formed on the upper and lower glass substrates. A spacer is formed between the upper and lower glass substrates to keep cell gaps of the liquid crystal cells Clc constant.

The liquid crystal display according to the embodiment of the invention may be embodied in any liquid crystal mode as well as the TN, VA, IPS, and FFS modes. Further, the liquid crystal display according to the embodiment of the invention may be implemented as any type liquid crystal display including a backlit liquid crystal display, a transflective liquid crystal display, and a reflective liquid crystal display.

The timing controller TCON receives an external timing signal such as, vertical and horizontal sync signals Vsync and Hsync, an external data enable signal DE, and a dot clock CLK through an interface, such as a low voltage differential signaling (LVDS) interface and a transition minimized differential signaling (TMDS) interface to generate timing control signals for controlling operation timings of the source drive ICs SDIC#1 to SDIC#8 and operation timings of the gate drive ICs GDIC#1 to GDIC#4. The timing control signals include a gate timing control signal for controlling the operation timings of the gate drive ICs GDIC#1 to GDIC#4 and a source timing control signal for controlling the operation timings of the source drive ICs SDIC#1 to SDIC#8.

The timing controller TCON is connected to the source drive ICs SDIC#1 to SDIC#8 in a point-to-point manner. The timing controller TCON transfers a preamble signal for initializing the source drive ICs SDIC#1 to SDIC#8, a source control data including the source timing control signal, a clock, RGB digital video data, etc. to each of the source drive ICs SDIC#1 to SDIC#8 through each of a plurality of pairs of data bus lines.

The gate timing control signal includes a gate start pulse GSP, a gate shift clock GSC, a gate output enable signal GOE, and the like. The gate start pulse GSP is applied to the first gate drive IC GDIC#1 to thereby indicate scan start time of a scan operation so that the first gate drive IC GDIC#1 generates a first gate pulse. The gate shift clock GSC is a clock for shifting the gate start pulse GSP. A shift register of each of the gate drive ICs GDIC#1 to GDIC#4 shits the gate start pulse GSP at a rising edge of the gate shift clock GSC. The second to fourth gate drive ICs GDIC#2 to GDIC#4 receive a carry signal of the first gate drive IC GDIC#1 as a gate start pulse to start operating. The gate output enable signal GOE controls output timings of the gate drive ICs GDIC#1 to GDIC#4. The gate drive ICs GDIC#1 to GDIC#4 output a gate pulse in a low logic level state of the gate output enable signal GOE, i.e., during a period of time ranging from immediately after a falling edge of a current pulse to immediately before a rising edge of a next pulse. 1 cycle of the gate output enable signal GOE is about 1 horizontal period.

The source timing control signal is transferred to the source drive ICs SDIC#1 to SDIC#8 through the pair of data bus lines for a predetermined time interval between a transfer time of the preamble signal and a transfer time of the RGB digital video data. The source timing control signal includes polarity-related control data, source output-related control data, etc. The polarity-related control data includes a control information for controlling a polarity control signal POL of pulse form generated inside the source drive ICs SDIC#1 to SDIC#8. A digital-to-analog convertor (DAC) of each of the source drive ICs SDIC#1 to SDIC#8 converts the RGB digital video data into an positive or negative analog video data voltage in response to the polarity control signal POL. The source output-related control data includes a control information for controlling a source output enable signal SOE of pulse form generated inside the source drive ICs SDIC#1 to SDIC#8. The source output enable signal SOE controls an output timing of the positive/negative analog video data voltage from the source drive ICs SDIC#1 to SDIC#8.

Each of the gate drive ICs GDIC#1 to GDIC#4 sequentially supplies the gate pulse to the gate lines GL in response to the gate timing control signal.

Each of the source drive ICs SDIC#1 to SDIC#8 locks a frequency and a phase of an internal clock pulse output from a clock separation and data sampling unit embedded inside each of the source drive ICs SDIC#1 to SDIC#8 depending on the preamble signal transferred from the timing controller TCON through the pair of data bus lines. Then, each of the source drive ICs SDIC#1 to SDIC#8 restores a clock from a source control packet input as a digital bit stream through the pair of data bus lines to generate a serial clock. Subsequently, each of the source drive ICs SDIC#1 to SDIC#8 samples the polarity-related control data and the source output-related control data. Each of the source drive ICs SDIC#1 to SDIC#8 outputs the polarity control signal POL and the source output enable signal SOE using the polarity-related control data and the source output-related control data.

After each of the source drive ICs SDIC#1 to SDIC#8 restores a clock from a source control packet input as a digital bit stream through the pair of data bus lines to restore the polarity control signal POL and the source output enable signal SOE, each of the source drive ICs SDIC#1 to SDIC#8 restores a clock from an RGB data packet input as a digital bit stream through the pair of data bus lines to generate a serial clock for data sampling. Further, each of the source drive ICs SDIC#1 to SDIC#8 samples RGB digital video data serially input depending on the serial clock. Each of the source drive ICs SDIC#1 to SDIC#8 deserializer the sequentially sampled RGB digital video data to output RGB parallel data. Then, each of the source drive ICs SDIC#1 to SDIC#8 converts the RGB parallel data into the positive/negative analog video data voltage in response to the polarity control signal POL to supply the positive/negative analog video data voltage to the data lines DL in response to the source output enable signal SOE.

Figure 2:
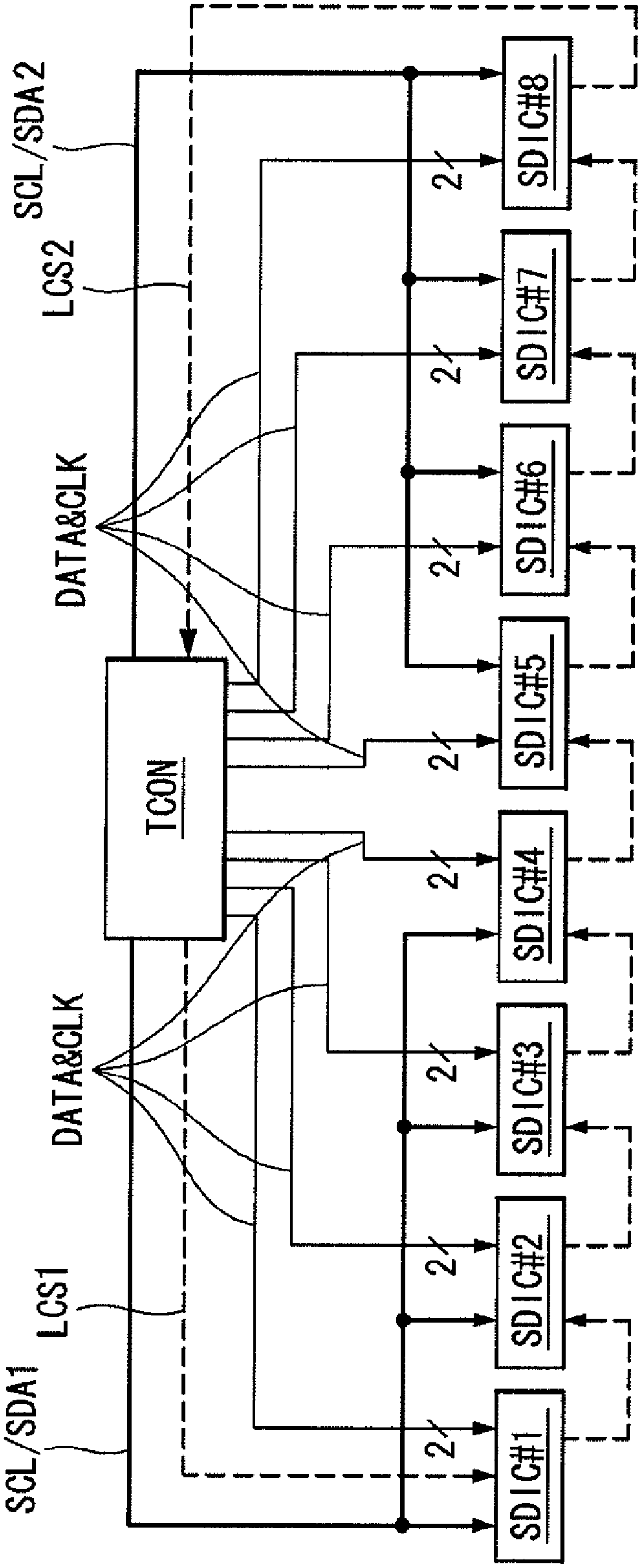
FIG. 2 illustrates lines between a timing controller and source drive integrated circuits (ICs)

FIG. 2 illustrates lines between the timing controller TCON and the source drive ICs SDIC#1 to SDIC#8.

As shown in FIG. 2, a plurality of pairs of data bus lines DATA&CLK, first and second pairs of control lines SCL/SDA1 and SCL/SDA2, lock check lines LCS1 and LCS2, etc. are formed between the timing controller TCON and the source drive ICs SDIC#1 to SDIC#8.

The timing controller TCON sequentially transfers the preamble signal, the source control packet, and the RGB data packet to each of the source drive ICs SDIC#1 to SDIC#8 through each of the pairs of data bus lines DATA&CLK. The source control packet is a bit stream including clock bits, polarity-related control data bits, source output-related control data bits, etc. The RGB data packet is a bit stream including clock bits, internal data enable clock bits, RGB data bits, etc. Each of the pairs of data bus lines DATA&CLK connects in series the timing controller TCON to each of the source drive ICs SDIC#1 to SDIC#8. Namely, the timing controller TCON is connected to the source drive ICs SDIC#1 to SDIC#8 in the point-to-point manner. Each of the source drive ICs SDIC#1 to SDIC#8 restores clocks input through the pair of data bus lines DATA&CLK. Accordingly, lines for transferring a clock carry and the RGB video data are not necessary between the adjacent source drive ICs SDIC#1 to SDIC#8.

Figure 8:
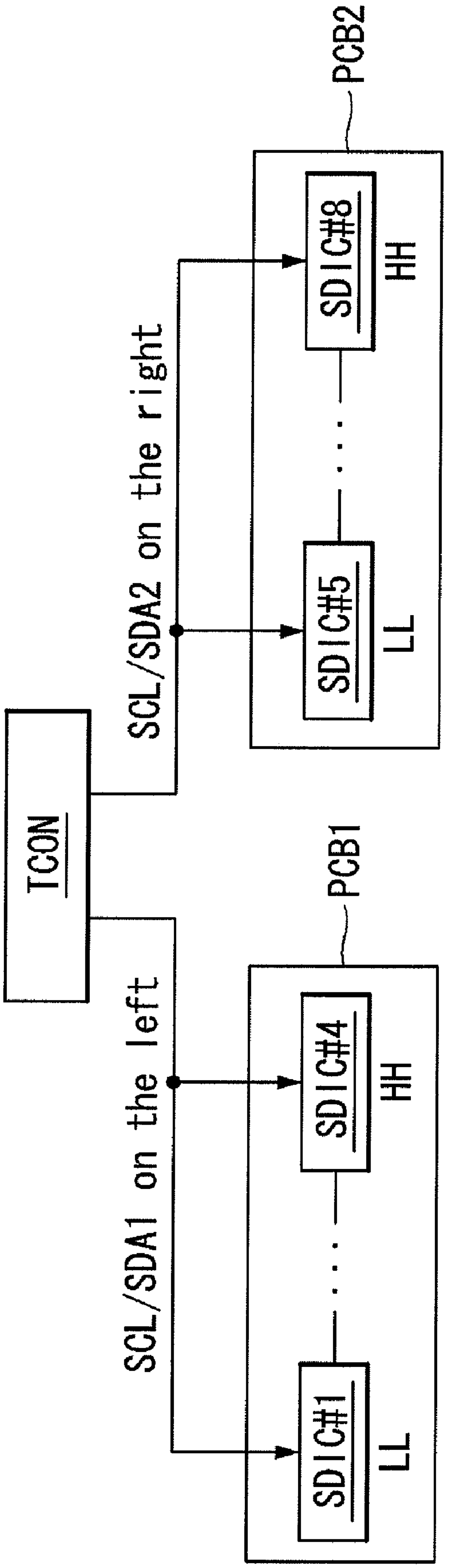
FIG. 8 illustrates an example of a serial communication control path and a chip identification code capable of allowing source drive ICs to perform a debugging operation.

The timing controller TCON transfers a chip identification code CID of each of the source drive ICs SDIC#1 to SDIC#8 and chip individual control data for controlling functions of each of the source drive ICs SDIC#1 to SDIC#8 to each of the source drive ICs SDIC#1 to SDIC#8 through the pairs of control lines SCL/SDA1 and SCL/SDA2. The pairs of control lines SCL/SDA1 and SCL/SDA2 are commonly connected between the timing controller TCON and the source drive ICs SDIC#1 to SDIC#8. More specifically, as shown in FIG. 8, if the source drive ICs SDIC#1 to SDIC#8 are divided into two groups and the two groups are respectively connected to printed circuit boards (PCBs) PCB1 and PCB2, the first pair of control lines SCL/SDA1 on the left connect in parallel the timing controller TCON to the first to fourth source drive ICs SDIC#1 to SDIC#4, and the second pair of control lines SCL/SDA2 on the right connect in parallel the timing controller TCON to the fifth to eighth source drive ICs SDIC#5 to SDIC#8.

The timing controller TCON supplies a lock signal LOCK, that confirms whether or not a phase and a frequency of the internal clock pulse output from the clock separation and data sampling unit of each of the source drive ICs SDIC#1 to SDIC#8 is stably locked, to the first source drive IC SDIC#1 through a lock check line LCS1. The source drive ICs SDIC#1 to SDIC#8 are cascade-connected to one another through the lock check line LCS1. If a frequency and a phase of an internal clock pulse output from the first source drive IC SDIC#1 are locked, the first source drive IC SDIC#1 transfers the lock signal LOCK of a high logic level to the second source drive IC SDIC#2. Next, after a frequency and a phase of an internal clock pulse output from the second source drive IC SDIC#2 are locked, the second source drive IC SDIC#2 transfers the lock signal LOCK of a high logic level to the third source drive IC SDIC#3. The above-described locking operation is sequentially performed, and finally, after a frequency and a phase of an internal clock pulse output from the last source drive IC SDIC# are locked, the last source drive IC SDIC#8 feedback-inputs the lock signal LOCK of a high logic level to the timing controller TCON through a feedback lock check line LCS2. Only after the timing controller TCON receives a feedback signal of the lock signal LOCK, the timing controller TCON transfers the RGB data packets to the source drive ICs SDIC#1 to SDIC#8.

Figure 3:
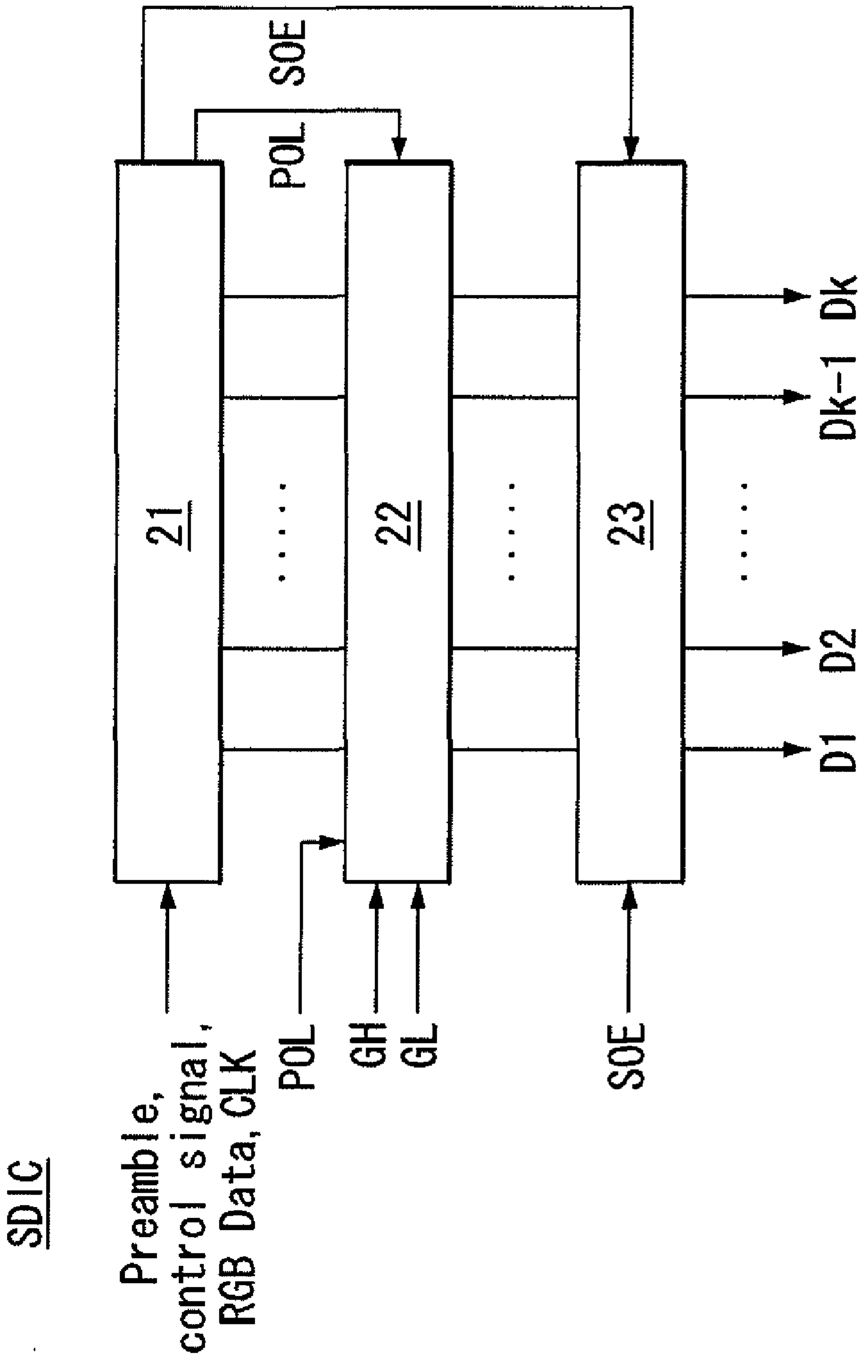
FIGS. 3 and 4 are block diagrams illustrating a configuration of a source drive IC.

FIG. 3 is a block diagram illustrating a configuration of the source drive ICs SDIC#1 to SDIC#8.

As shown in FIG. 3, each of the source drive ICs SDIC#1 to SDIC#8 supplies the positive/negative analog video data voltage to the k data lines D1 to Dk (where k is a positive integer less than m). Each of the source drive ICs SDIC#1 to SDIC#8 includes a clock separation and data sampling unit 21, a digital-to-analog converter (DAC) 22, an output circuit 23, etc.

In Phase 1, the clock separation and data sampling unit 21 locks the phase and the frequency of the internal clock pulse depending on the preamble signal input at a low frequency through the pair of data bus lines DATA&CLK. Subsequently, in Phase 2, the clock separation and data sampling unit 21 restores a reference clock from the source control packet input as a bit stream through the pair of data bus lines DATA&CLK and separates the polarity-related control data from the reference clock to thereby restore the polarity control signal POL based on the polarity-related control data. Further, the clock separation and data sampling unit 21 separates the source output-related control data from the source control packet to restore the source output enable signal SOE based on the source output-related control data.

Figure 7:
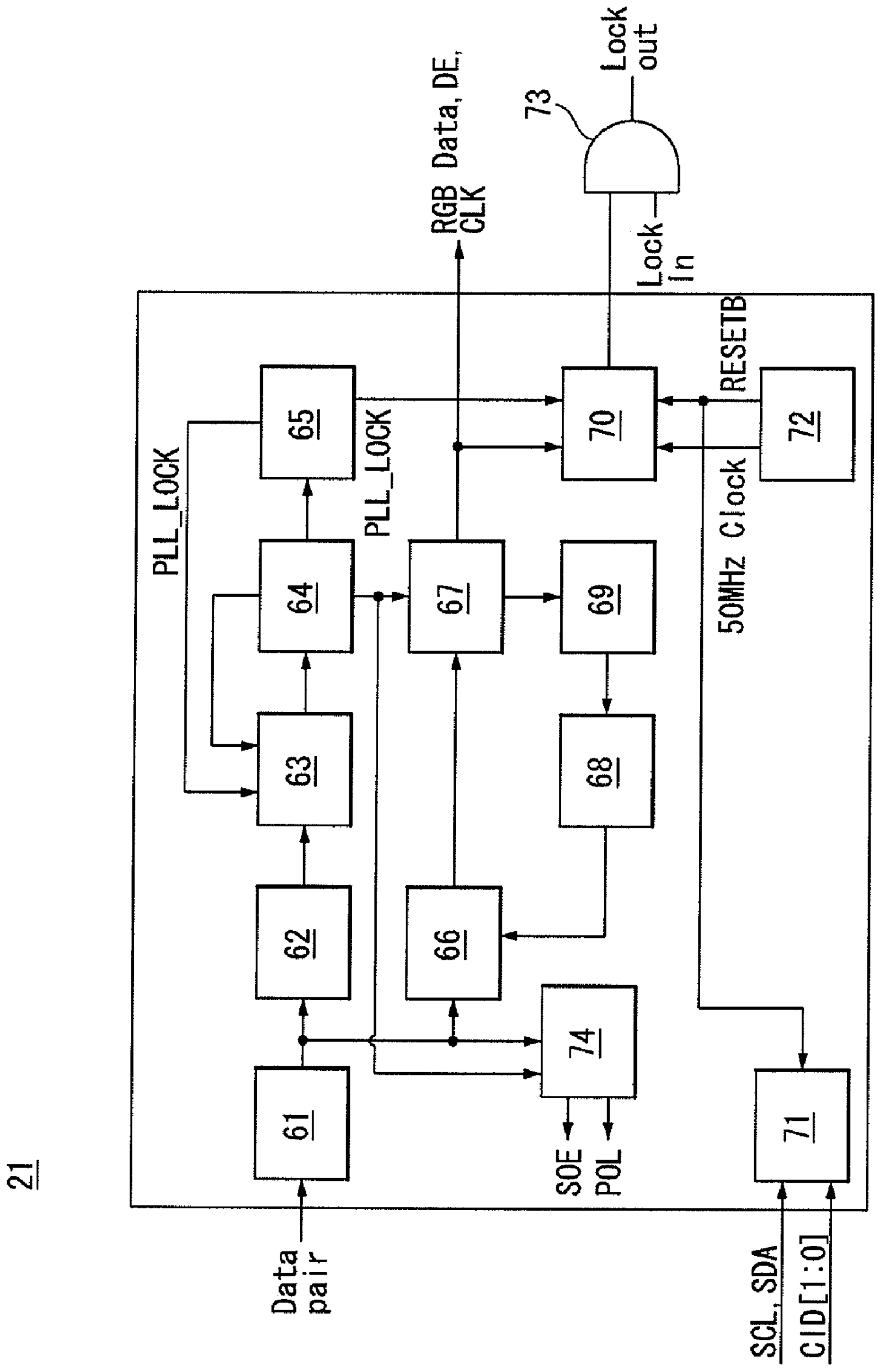
FIG. 7 is a block diagram illustrating a clock separation and data sampling unit.
Figure 9:
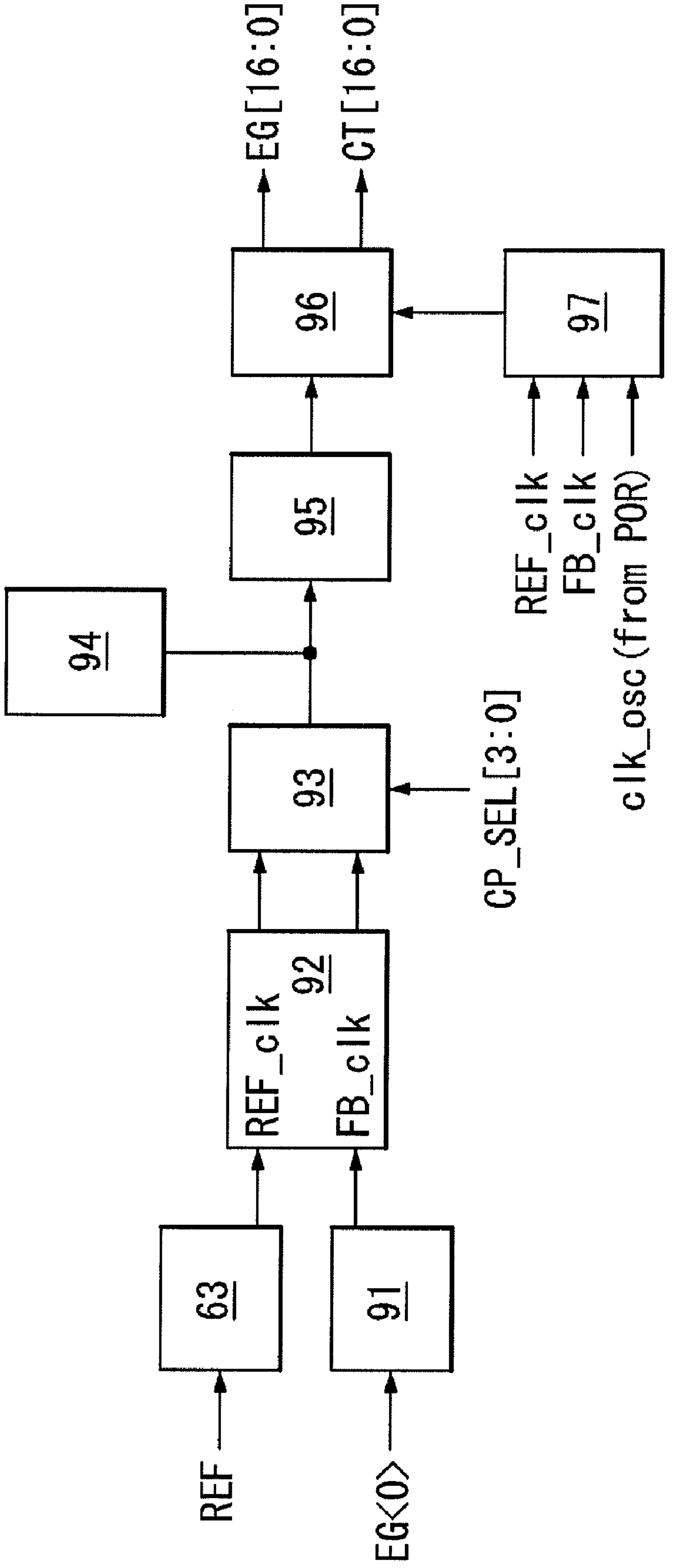
FIG. 9 is a block diagram illustrating a phase locked loop (PLL)

Subsequently, in Phase 3, the clock separation and data sampling unit 21 separates a clock from the RGB data packet input through the pair of data bus lines DATA&CLK to restore a reference clock. Further, the clock separation and data sampling unit 21 generates serial clock signals for sampling each of bits of the RGB digital video data depending on the reference clock. For this, the clock separation and data sampling unit 21 includes a phase locked circuit capable of outputting internal clock pulses having a stable phase and a stable frequency. Examples of the phase locked circuit include a phase locked loop (PLL) and a delay locked loop (DLL). In the embodiment, an example of using a PLL circuit as the phase locked circuit will be described later. In the embodiment, the clock separation and data sampling unit 21 may include the DLL as well as the PLL. FIGS. 7 to 9 illustrate an example of embodying the clock separation and data sampling unit 21 using the PLL. However, the clock separation and data sampling unit 21 may be embodied using the DLL.

The clock separation and data sampling unit 21 samples and latches each of the RGB data bits serially input through the pair of data bus lines DATA&CLK depending on the serial clock and then simultaneously outputs the latched RGB data. Namely, the clock separation and data sampling unit 21 converts serial data into RGB parallel data.

Figure 4:
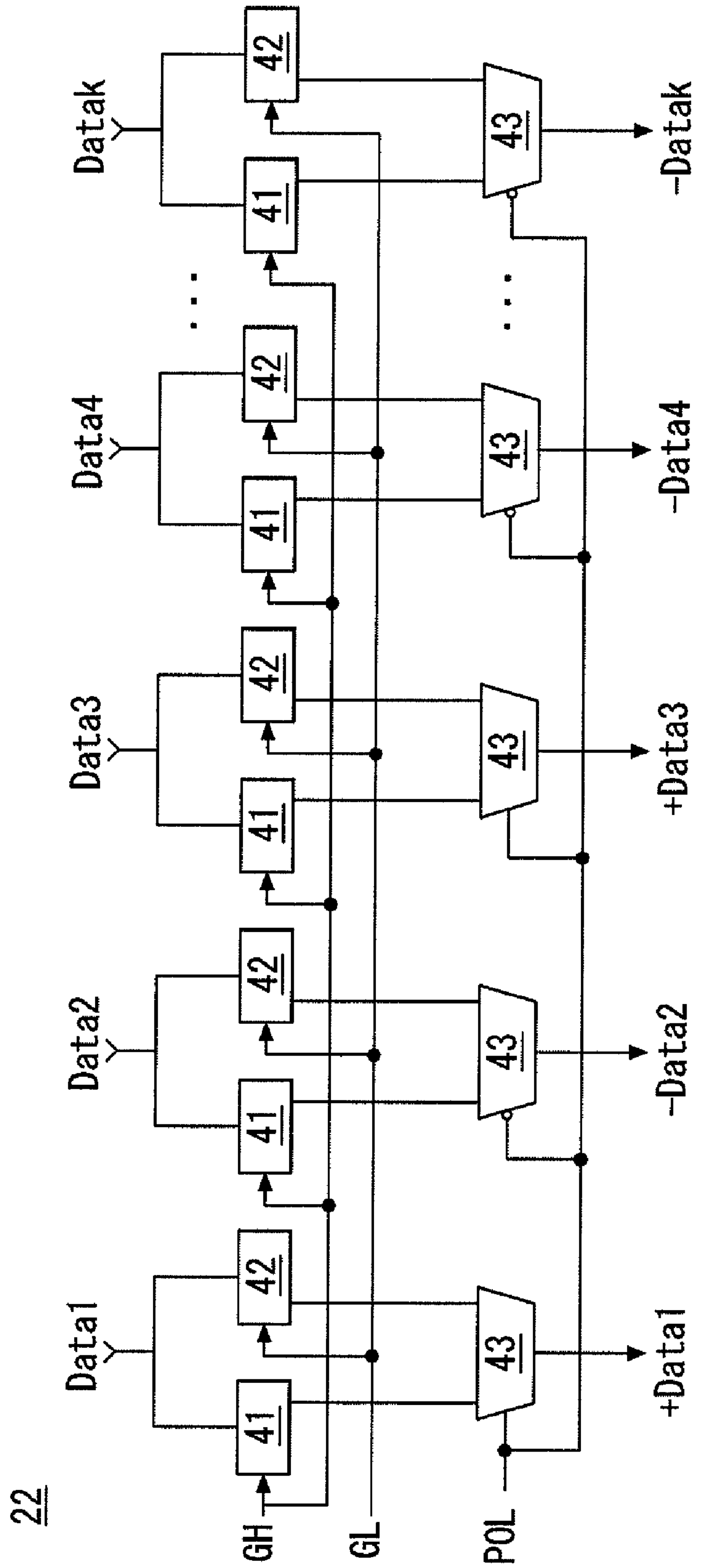

The DAC 22 converts the RGB digital video data from the clock separation and data sampling unit 21 into a positive gamma compensation voltage GH or a negative gamma compensation voltage GL in response to the polarity control signal POL and then converts the positive gamma compensation voltage GH or the negative gamma compensation voltage GL into a positive or negative analog video data voltage. For the above-described operation, as shown in FIG. 4, the DAC 22 includes a P-decoder (PDEC) 41 receiving the positive gamma compensation voltage GH, an N-decoder (NDEC) 42 receiving the negative gamma compensation voltage GL, and a multiplexer 43 selecting an output of the P-decoder 41 and an output of the N-decoder 42 in response to the polarity control signal POL. The P-decoder 41 decodes RGB digital video data input from the clock separation and data sampling unit 21 to output the positive gamma compensation voltage GH corresponding to a gray level of the RGB digital video data. The N-decoder 42 decodes RGB digital video data input from the clock separation and data sampling unit 21 to output the negative gamma compensation voltage GL corresponding to a gray level of the RGB digital video data. The multiplexer 43 alternately selects the positive gamma compensation voltage GH and the negative gamma compensation voltage GL in response to the polarity control signal POL and outputs the positive or negative analog video data voltage as the selected positive or negative gamma compensation voltage GH or GL.

The output circuit 23 supplies a charge share voltage or the common voltage Vcom to the data lines D1 to Dk through an output buffer during a high logic level period of the source output enable signal SOE. The output circuit 23 supplies the positive/negative analog video data voltage to the data lines D1 to Dk through the output buffer during a low logic level period of the source output enable signal SOE. The charge share voltage is generated when the data line receiving the positive analog video data voltage and the data line receiving the negative analog video data voltage are short-circuited. The charge share voltage has an average voltage level between the positive analog video data voltage and the negative analog video data voltage.

Figure 5:
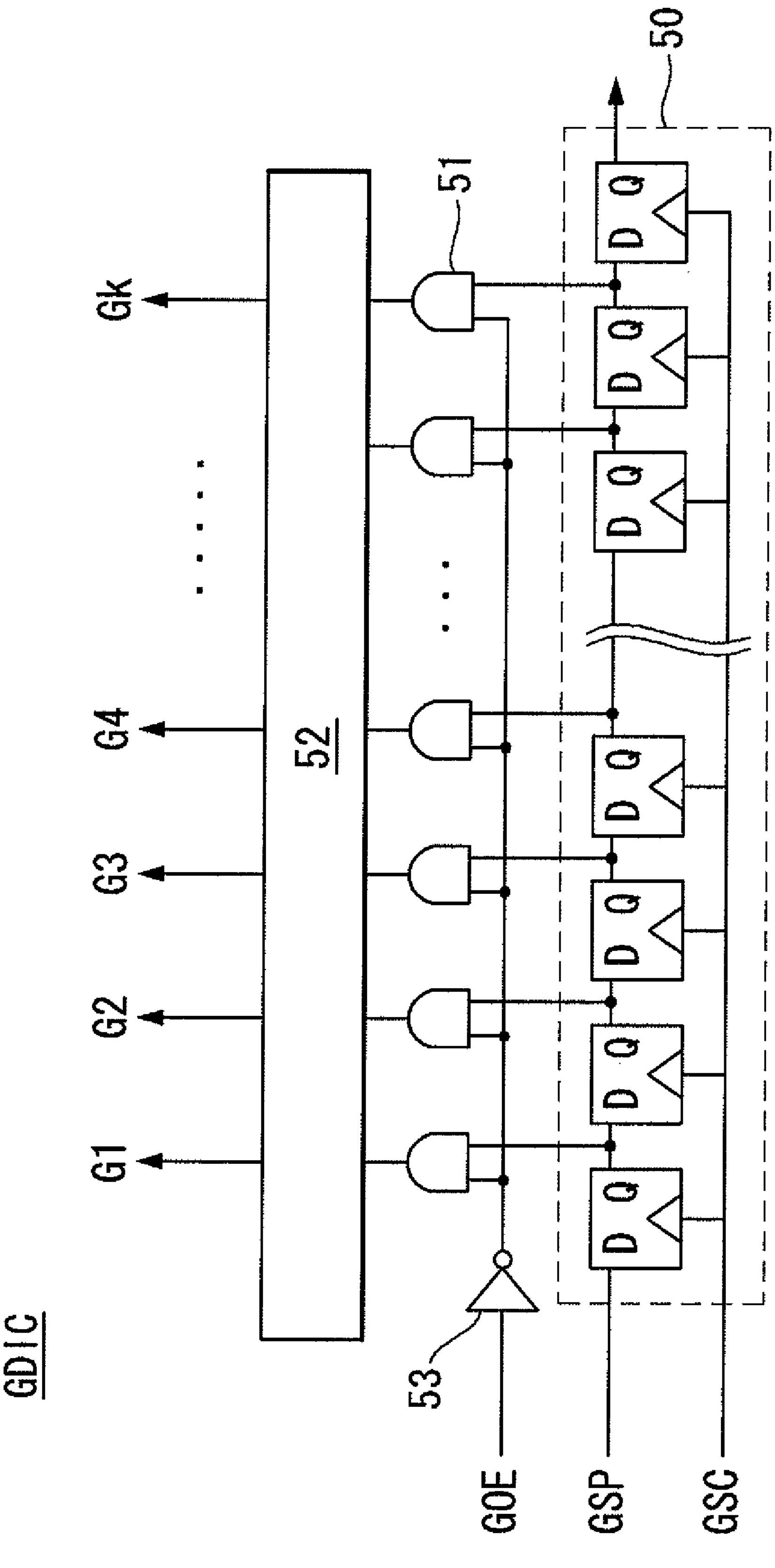
FIG. 5 is a block diagram illustrating a configuration of a gate drive IC.

FIG. 5 is a block diagram illustrating a configuration of the gate drive ICs GDIC#1 to GDIC#4.

As shown in FIG. 5, each of the gate drive ICs GDIC#1 to GDIC#4 includes a shift register 50, a level shifter 52, a plurality of AND gates 51 connected between the shift register 50 and the level shifter 52, and an inverter 53 for inverting the gate output enable signal GOE.

The shift register 50 includes a plurality of cascade connected D flip-flops and sequentially shifts the gate start pulse GSP in response to the gate shift clock GSC using the cascade connected D flip-flops. Each of the AND gates 51 performs an AND operation on an output signal of the shift register 50 and an inversion signal of the gate output enable signal GOE to obtain an output. The inverter 53 inverts the gate output enable signal GOE and supplies the inversion signal of the gate output enable signal GOE to the AND gates 51. Accordingly, each of the gate drive ICs GDIC#1 to GDIC#4 outputs the gate pulse when the gate output enable signal GOE is in a low logic level state.

The level shifter 52 shifts a swing width of an output voltage of the AND gate 51 to a swing width suitable to drive the TFTs in the pixel array of the liquid crystal display panel 10. An output signal of the level shifter 52 is sequentially supplied to the gate lines G1 to Gk.

The shift register 50 together with the TFTs of the pixel array may be directly formed on the glass substrate of the liquid crystal display panel 10. In this case, the level shifter 52 may be formed on not the glass substrate of the liquid crystal display panel 10 but a control board or a source PCB together with the timing controller TCON, a gamma voltage generating circuit, etc.

Figure 6:
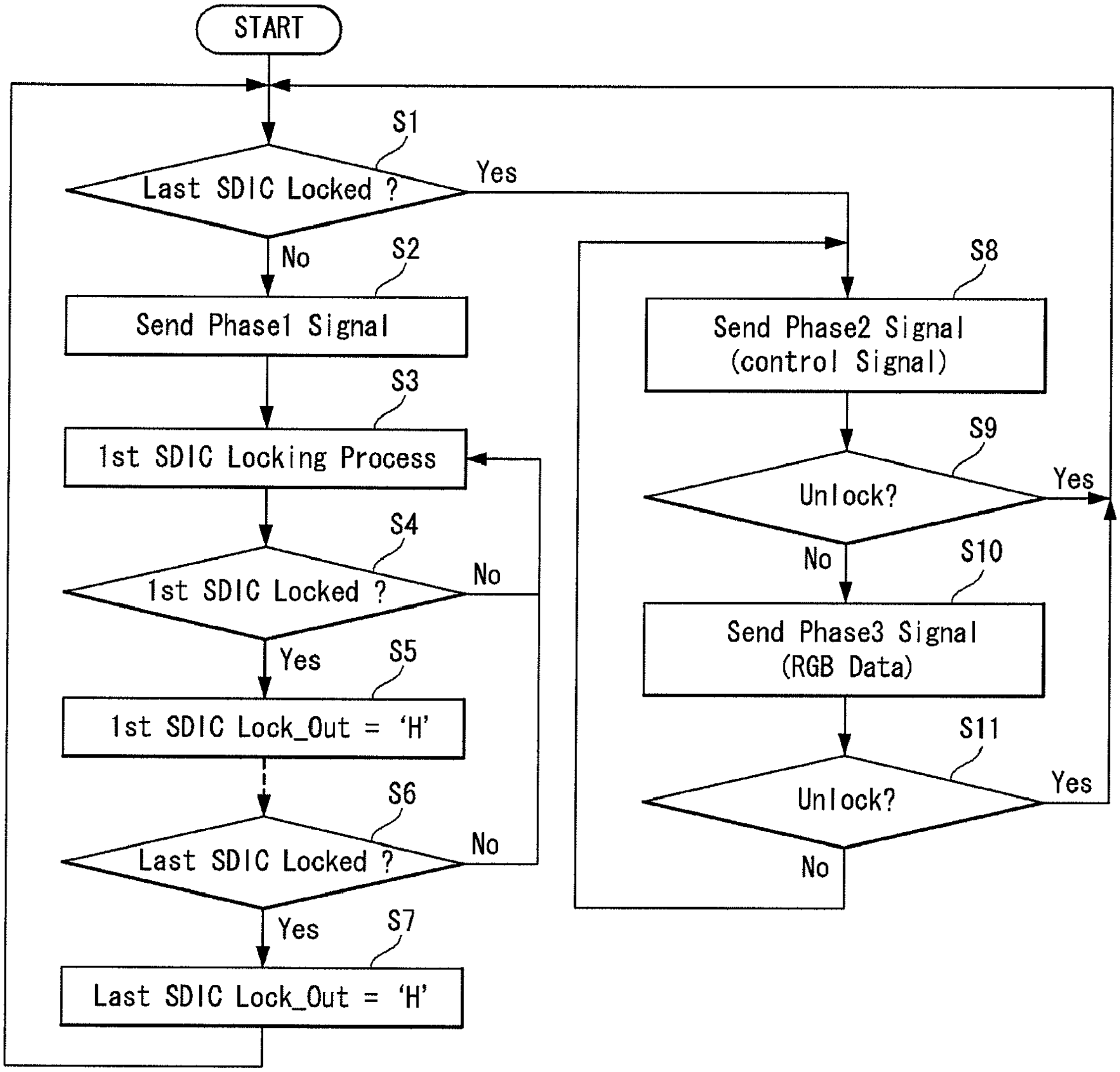
FIG. 6 is a flow chart illustrating in stages a signal transfer process between a timing controller and source drive ICs.

FIG. 6 is a flow chart illustrating in stages a signal transfer process between the timing controller TCON and the source drive ICs SDIC#1 to SDIC#8.

As shown in FIG. 6, if a power is applied to the liquid crystal display, the timing controller TCON supplies Phase 1 signals to each of the source drive ICs SDIC#1 to SDIC#8 through each of the pairs of data bus lines DATA&CLK in steps S1 and S2. The Phase 1 signals include the preamble signal of a low frequency and a lock signal supplied to the first source drive IC SDIC#1.

The clock separation and data sampling unit 21 of the first source drive IC SDIC#1 restores the preamble signal to a PLL reference clock and transfers a lock signal of a high logic level to the second source drive IC SDIC#2 when a phase of the PLL reference clock and a phase of an internal clock pulse output from the PLL of the first source drive IC SDIC#1 are locked, in steps S3 to S5. Subsequently, when internal clock pulses output from the clock separation and data sampling units 21 of the second to eighth source drive ICs SDIC#2 to SDIC#8 are sequentially locked stably, the eighth source drive IC SDIC#8 feedback inputs a lock signal of a high logic level to the timing controller TCON in steps S6 and S7.

If the timing controller TCON receives the lock signal of the high logic level from the eighth source drive IC SDIC#8, the timing controller TCON decides that a phase and a frequency of the internal clock pulse output from the clock separation and data sampling unit 21 of each of all the source drive ICs SDIC#1 to SDIC#8 are stably locked. Thus, the timing controller TCON supplies Phase 2 signals to the source drive ICs SDIC#1 to SDIC#8 through the pairs of data bus lines DATA&CLK in the point-to-point manner in step S8. The Phase 2 signals include a plurality of source control packets including polarity-related control data bits and source output-related control data bits.

Following the Phase 2 signals, the timing controller TCON supplies Phase 3 signals to the source drive ICs SDIC#1 to SDIC#8 in the point-to-point manner in step S10. The Phase 3 signals include a plurality of RGB data packets to which the liquid crystal cells on 1 line of the liquid crystal display panel 10 will be charged during 1 horizontal period.

The PLL output of the clock separation and data sampling unit 21 of each of the source drive ICs SDIC#1 to SDIC#8 may be unlocked during an output transfer process of the Phase 2 signals or the Phase 3 signals. Namely, the phase and the frequency of the internal clock pulse output from the PLL of the clock separation and data sampling unit 21 may be unlocked. More specifically, when the timing controller TCON receives the feedback signal of the lock signal inverted at a low logic level, the timing controller TCON decides that the internal clock pulses output from the PLL of the clock separation and data sampling unit 21 are unlocked, in step S9 and S11. Thus, the timing controller TCON transfers the Phase 1 signals to the source drive ICs SDIC#1 to SDIC#8. Subsequently, after, the phase and the frequency of the internal clock pulse output from the PLL of each of the source drive ICs SDIC#1 to SDIC#8 are locked, the timing controller TCON again starts performing the output transfer process of the Phase 2 signals and the Phase 3 signals.

FIG. 7 is a block diagram illustrating the clock separation and data sampling unit 21 of each of the source drive ICs SDIC#1 to SDIC#8.

As shown in FIG. 7, the clock separation and data sampling unit 21 includes an on-die terminator (ODT) 61, an analog delay replica (ADR) 62, a clock separator 63, a PLL 64, a PLL lock detector 65, a tunable analog delay 66, a deserializer 67, a digital filter 68, a phase detector 69, a lock detector 70, an $I^2C$ controller 71, a power-on reset (POR) 72, an AND gate 73, and an SOE&POL restoring unit 74.

The ODT 61 includes a termination resistor embedded inside the ODT 61 to improve signal integrity by removing a noise mixed in the preamble signal, the source control packet, and the RGB data packet received through the pairs of data bus lines DATA&CLK. Further, the ODT 61 includes a receiving buffer and an equalizer embedded inside the ODT 61 to amplify an input differential signal and to convert the amplified differential signal into digital data. The ADR 62 delays the RGB data and the clock received from the ODT 61 by a delay value of the tunable analog delay 66 to allow a delay value of a clock path to be equal to a delay value of a data path.

The clock separator 63 separates clock bits from the source control packet and the RGB data packet restored by the ODT 61 to restore the clock bits to a reference clock of the PLL 64. The clock bits include clock bits, dummy clock bits, internal data enable clock bits, etc. The PLL 64 generates clocks for sampling the source control packet bits and the RGB data packet bits. If the RGB data packet includes 10-bit RGB data and 4-bit clocks are assigned between the 10-bit RGB data, the PLL 64 generates 34 internal clock pulses per 1 RGB data packet. The PLL lock detector 65 checks a phase and a frequency of each of the internal clock pulses output from the PLL 64 in conformity with a predetermined data rate to detect whether or not the internal clock pulses are locked.

The tunable analog delay 66 compensates for a slight phase difference between the RGB digital data received from the ODT 61 and restored clocks feedback-input via the phase detector 69 and the digital filter 68, so that data can be sampled in the center of the clock. The deserializer 67 includes a plurality of flip-flops embedded inside the deserializer 67 to sample and latch the RGB digital video data bits serially input based on internal serial clock pulses serially output from the PLL 64. Then, the deserializer 67 simultaneously outputs the latched RGB digital video to thereby output RGB parallel data.

The digital filter 68 and the phase detector 69 receive the sampled RGB digital video data and determine a delay value of the tunable analog delay 66. The lock detector 70 compares the RGB parallel data restored by the deserializer 67 with an output PLL_LOCK of the PLL lock detector 65 to check an error amount of data enable clocks of the RGB parallel data. If the error amount is equal to or greater than a predetermined value, a physical interface (PHY) circuit entirely operates again by unlocking the internal clock pulses output from the PLL 64. The lock detector 70 generates an output of a low logic level when the internal clock pulses output from the PLL 64 are unlocked. On the other hand, the lock detector 70 generates an output of a high logic level when the internal clock pulses output from the PLL 64 are locked. The AND gate 73 performs an AND operation on a lock signal “Lock In” received from the timing controller TCON or a lock signal “Lock In” transferred by the source drive ICs SDIC#1 to SDIC#7 in previous stage and an output of the lock detector 70. Then, the AND gate 73 outputs a lock signal “Lock Out” of a high logic level when the lock signal “Lock In” and the output of the lock detector 70 are in a high logic level state. The lock signal “Lock Out” of the high logic level is transferred to the source drive ICs SDIC#2 to SDIC#8 in next stage, and the last source drive IC SDIC#8 inputs the lock signal “Lock Out” to the timing controller TCON.

The POR 72 generates a reset signal RESETB for initializing the clock separation and data sampling unit 21 depending on a previously set power sequence and generates a clock of about 50 MHz to supply the clock to digital circuits including the above circuits.

The $I^2C$ controller 71 controls an operation of each of the above circuit blocks using the chip identification code CID input as serial data through the pair of control lines SCL/SDA and the chip individual control data. The chip identification codes CID each having a different logic level are respectively given to the source drive ICs SDIC#1 to SDIC#8 as shown in FIG. 8, so that the source drive ICs SDIC#1 to SDIC#8 can be individually controlled. The $I^2C$ controller 71 may perform PLL power down, buffer power down of the ODT 61, EQ On/Off operation of the ODT 61, a control of a charge bump current of the PLL 64, a control of VCO range manual selection of the PLL 64, PLL lock signal push through $I^2C$ communication, an adjustment of an analog delay control value, disable of the lock detector 70, a change in a coefficient of the digital filter 68, a change function in a coefficient of the digital filter 68, physical interface (PHY)_RESETB signal push through $I^2C$, an operation of substituting the lock signal of the previous source drive ICs SDIC#1 to SDIC#7 with a reset signal of the current source drive ICs SDIC#1 to SDIC#8, setting of a vertical resolution of an input image, a storage of a history about data enable clock transition for analyzing a generation cause of the physical interface (PHY)_RESETB signal, etc depending on the chip individual control data input from the timing controller TCON through serial data bus SDA of the pair of control lines SCL/SDA.

The SOE&POL restoring unit 74 samples the polarity-related control data of the source control packet from the ODT 61 based on the internal clock pulses output from the PLL 64 to generate the polarity control signal POL of a high logic level (or a low logic level). Then, the SOE&POL restoring unit 74 inverts a logic level of the polarity control signal POL every i horizontal periods (where, "i" is a natural number). The SOE&POL restoring unit 74 samples the source output-related control data of the source control packet from the ODT 61 depending on the internal clock pulses output from the PLL 64. Then, the SOE&POL restoring unit 74 generates the source output enable signal SOE depending on the source output-related control data using methods illustrated in FIGS. 16 to 18C and adjusts a pulse width of the source output enable signal SOE.

FIG. 9 is a block diagram illustrating the PLL 64.

As shown in FIG. 9, the PLL 64 includes a phase comparator 92, a charge pump 93, a loop filter 94, a pulse-to-voltage converter 95, a voltage controlled oscillator (VCO) 96, and a digital controller 97.

The phase comparator 92 compares a phase of a reference clock REF_clk received from the clock separator 63 with a phase of a feedback edge clock FB_clk received from a clock separator replica (CSR) 91. The phase comparator 92 has a pulse width corresponding to a phase difference between the reference clock REF_clk and the feedback edge clock FB_clk as a comparison result. When the phase of the reference clock REF_clk is earlier than the phase of the feedback edge clock FB_clk, the phase comparator 92 outputs a positive pulse. On the other hand, when the phase of the reference clock REF_clk is later than the phase of the feedback edge clock FB_clk, the phase comparator 92 outputs a negative pulse.

The charge pump 93 controls an amount of charges supplied to the loop filter 94 depending on a width and a polarity of an output pulse of the phase comparator 92. The loop filter 94 accumulates or discharges the charges depending on the amount of charges controlled by the charge pump 93 and removes a high frequency noise including a harmonic component in a clock input to the pulse-to-voltage converter 95.

The pulse-to-voltage converter 95 converts a pulse received from the loop filter 94 into a control voltage of the VCO 96 and controls a level of the control voltage of the VCO 96 depending on a width and a polarity of the pulse received from the loop filter 94. When a bit stream of 1 RGB data packet includes 10-bit RGB data and 4 clock bits, the VCO 96 generates 34 edge clocks and 34 center clocks per the 1 RGB data packet. Further, the VCO 96 controls a phase delay amount of clocks depending on the control voltage from the pulse-to-voltage converter 95 and depending on control data from the digital controller 97.

A first edge clock EG[0] output from the VCO 96 is a feedback edge clock and is input to the clock separator replica 91. The feedback edge clock EG[0] has a frequency corresponding to 1/34 of an output frequency of the VCO 96. The digital controller 97 receives the reference clock REF_clk from the clock separator 63 and the feedback edge clock FB_clk from the clock separator replica 91 and compares a phase of the reference clock REF_clk with a phase of the feedback edge clock FB_clk. Further, the digital controller 97 compares a phase difference obtained as a comparison result with a phase of a 50-MHz clock signal clk_osc from the POR 72. The digital controller 97 controls an output delay amount of the VCO 96 depending on a comparison result of a phase difference to select an oscillation area of the VCO 96.

Figure 10:
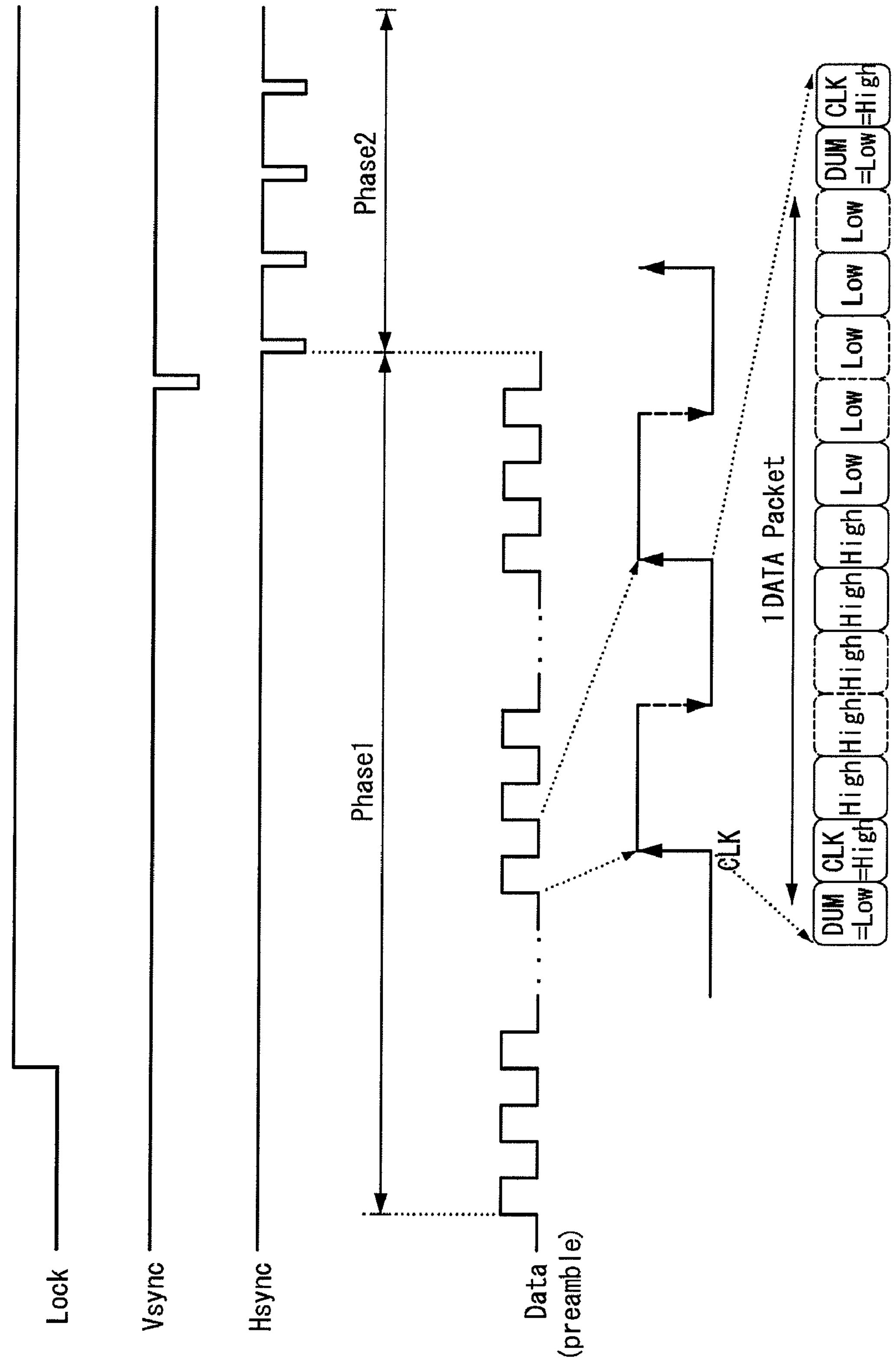
FIG. 10 is a waveform diagram illustrating Phase 1 signals generated by a timing controller.

FIG. 10 is a waveform diagram illustrating signals generated by the timing controller TCON in Phase 1.

As shown in FIG. 10, in Phase 1, the timing controller TCON generates a lock signal and a preamble signal of a low frequency. In the preamble signal of the low frequency, a plurality of bits having a high logic level are successively arranged, and then a plurality of bits having a low logic level are successively arranged. A frequency of the preamble signal corresponds to 1/34 of a frequency of the internal clock pulse output from the PLL 64 of the clock separation and data sampling unit 21 when a bit stream of 1 RGB data packet includes 10-bit RGB data and 4 clock bits. The clock separator 63 of the clock separation and data sampling unit 21 transitions the reference clock REF_clk to a high logic level in synchronization with bits of the preamble signal of a high logic level and transitions the reference clock REF_clk to a low logic level in synchronization with bits of the preamble signal of a low logic level.

The clock separation and data sampling unit 21 of each of the source drive ICs SDIC#1 to SDIC#8 repeatedly performs an operation of comparing the phase of the reference clock REF_clk generated depending on the preamble signal with the phase of the feedback edge clock FB_clk and locking the internal clock pulses. If the internal clock pulses are stably locked, the lock signal is transferred to the source drive ICs SDIC#1 to SDIC#8 in next stage.

In an initial power-on phase of the liquid crystal display, the timing controller TCON receives the lock signal from the last source drive IC SDIS#8 to confirm that a phase and a frequency of the internal clock pulses serially output from the clock separation and data sampling unit 21 are locked. Then, the timing controller TCON outputs the Phase 2 signals during a blanking period of the vertical sync signal Vsync.

Figure 11:
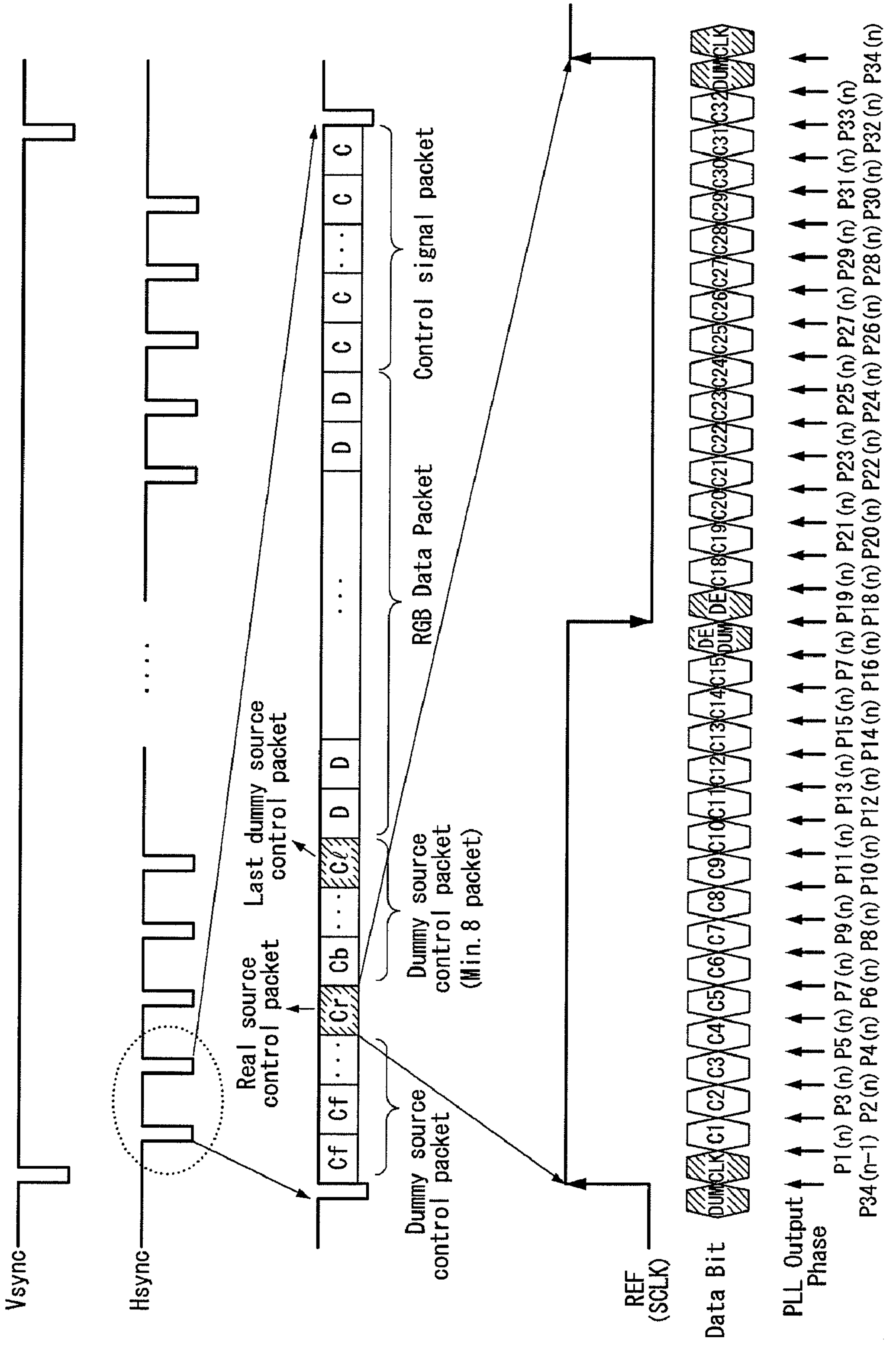
FIG. 11 is a waveform diagram illustrating Phase 2 signals generated by a timing controller.

FIG. 11 is a waveform diagram illustrating signals generated by the timing controller TCON in Phase 2.

As shown in FIG. 11, in Phase 2, the timing controller TCON successively transfers a plurality of front dummy source control packets Cf, at least one real source control packet Cr, a plurality of back dummy source control packets Cb and Cl in the order named to each of the source drive ICs SDIC#1 to SDIC#8 through the pair of data bus lines DATA&CLK during a blanking period, in which there is no data, in 1 cycle (i.e., 1 horizontal period) of the horizontal sync signal Hsync.

The plurality of front dummy source control packets Cf are successively transferred to the source drive ICs SDIC#1 to SDIC#8 prior to the real source control packet Cr, so that the clock separation and data sampling unit 21 stably receives the real source control packet Cr. The real source control packet Cr includes polarity-related control data bits and source output-related control data bits for controlling a polarity inversion operation and a data output of the source drive ICs SDIC#1 to SDIC#8. The plurality of back dummy source control packets Cb and Cl subsequent to the real source control packet Cr are successively transferred to the source drive ICs SDIC#1 to SDIC#8, so that the clock separation and data sampling unit 21 performs a receiving confirming operation of the real source control packet Cr and stably receives the Phase 3 signals. A bit value indicating that the Phase 3 signals are transferred subsequent to a last dummy source control packet Cl of the back dummy source control packets Cb and Cl is assigned to the last dummy source control packet Cl. Because the source drive ICs SDIC#1 to SDIC#8 read the bit value of the last dummy source control packet Cl and thus can previously know an input of the RGB data packet subsequent to the last dummy source control packet Cl, the source drive ICs SDIC#1 to SDIC#8 can stably perform an RGB data sampling operation.

The front dummy source control packets Cf, the real source control packet Cr, and the back dummy source control packets Cb and Cl may be distinguished from one another by predetermined bit values as shown in a data mapping table of FIG. 15. Accordingly, the SOE&POL restoring unit 74 of the clock separation and data sampling unit 21 distinguishes the source control packets Cf, Cr, Cb, and Cl from one another by predetermined bit values. Thus, the SOE&POL restoring unit 74 may discriminate between the polarity-related control data and the source output-related control data of the real source control packet Cr.

The clock separation and data sampling unit 21 of each of the source drive ICs SDIC#1 to SDIC#8 separates clocks from the source control packets Cf, Cr, Cb, and Cl to restore a reference clock and compares a phase of the reference clock with a phase of internal clock pulses of a high frequency to serially output the internal clock pulses for sampling the polarity-related control data bits and the source output-related control data bits. Further, the clock separation and data sampling unit 21 generates the polarity control signal POL depending on the sampled polarity-related control data and generates the source output enable signal SOE depending on the sampled source output-related control data.

As shown in FIG. 11, an RGB data packet is transferred subsequent to the plurality of source control packets Cf, Cr, Cb, and Cl during 1 horizontal period, and then a plurality of source control packets may be additionally transferred subsequent to the RGB data packet. The source control packets additionally transferred subsequent to the RGB data packet may include at least one real source control packet and a plurality of dummy source control packets, and the real source control packet may affect an RGB data packet of a next horizontal period.

Figure 12:
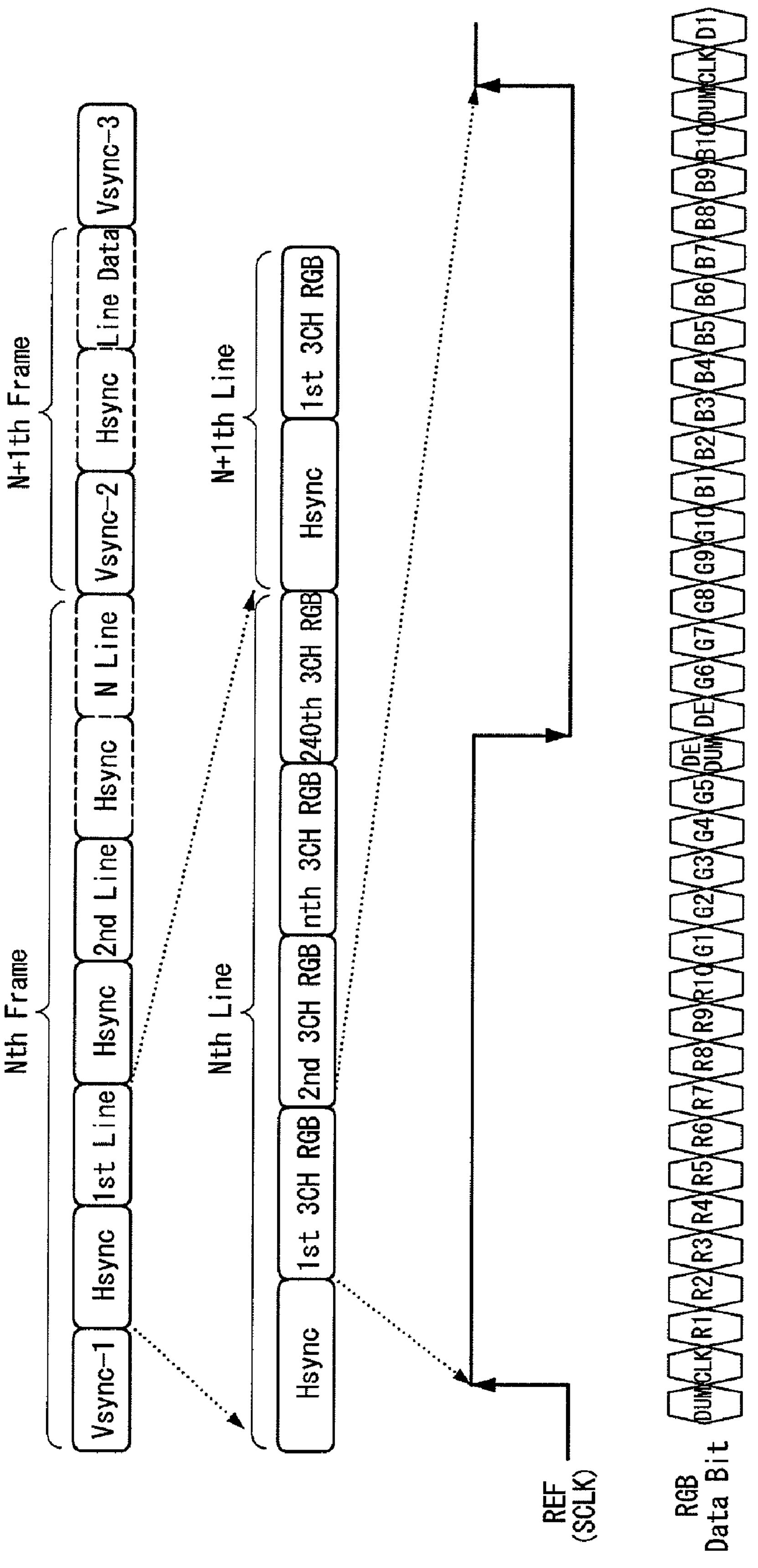
FIGS. 12 and 13 are waveform diagrams illustrating Phase 3 signals generated by a timing controller.
Figure 13:
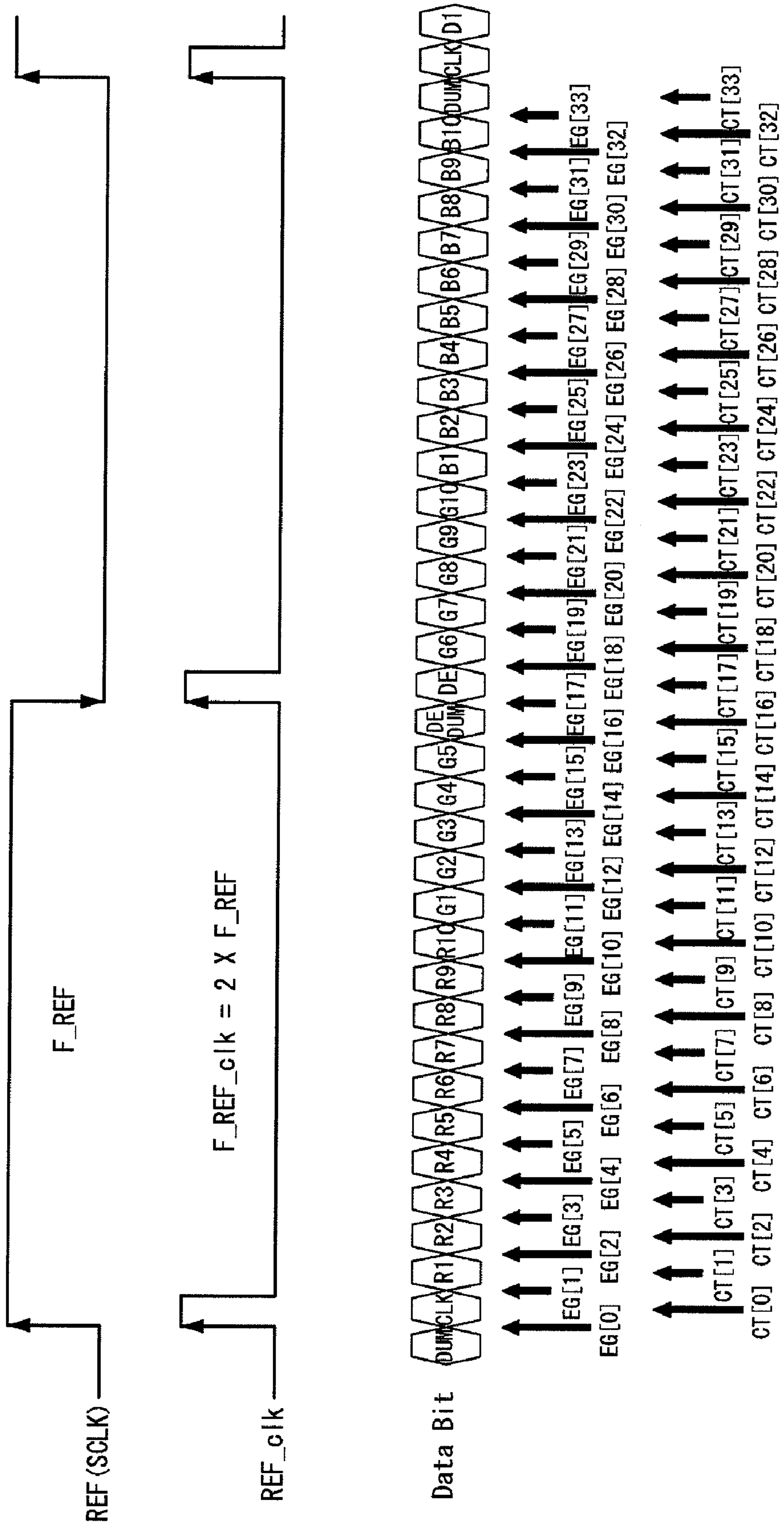

FIGS. 12 and 13 are waveform diagrams illustrating signals generated by the timing controller TCON in Phase 3.

As shown in FIGS. 12 and 13, following the Phase 2 signals, the timing controller TCON transfers Phase 3 signals (i.e., a plurality of RGB data packets to be displayed on 1 line of the liquid crystal display) to each of the source drive ICs SDIC#1 to SDIC#8 through the pair of data bus lines DATA&CLK during 1 horizontal period.

More specifically, the clock separation and data sampling unit 21 separates a clock CLK and an internal data enable clock DE from the RGB data packet to restore a reference clock. Then, the clock separation and data sampling unit 21 compares a phase of the reference clock with a phase of internal clock pulses of a high frequency to serially output the internal clock pulses for sampling each of the RGB digital video data bits. If a bit stream of 1 RGB data packet includes 10-bit RGB data and 4 clock bits, bits of a dummy clock DUM of a low logic level, bits of a clock CLK of a high logic level, bits R1 to R10, bits G1 to G5, bits of a dummy data enable clock DE DUM of a low logic level, bits of an internal data enable clock DE of a high logic level, bits G6 to G10, and bits B1 to B10 are successively assigned to the 1 RGB data packet in the order named. The clock separation and data sampling unit 21 detects the clock CLK and the internal data enable clock DE and thus may decide data serially input subsequent to the clock CLK and the internal data enable clock DE as the RGB digital video data. Further, the clock separation and data sampling unit 21 samples the RGB digital video data depending on sampling clock.

The clock separation and data sampling unit 21 sets bit values of the dummy data enable clock DE DUM and the data enable clock DE in each of the Phase 1 signal and the Phase 2 signal at different bit values from bit values of the dummy data enable clock DE DUM and the data enable clock DE in the Phase 3 signal. Thus, the clock separation and data sampling unit 21 reads the bit values of the dummy data enable clock DE DUM and the data enable clock DE in Phase 3 to sample the RGB data in not Phase 1 and Phase 2 but Phase 3.

The clock separator 63 of the clock separation and data sampling unit 21 generates a reference clock REF_clk, whose a rising edge is synchronized with the clock CLK and the internal data enable clock DE. Because the reference clock REF_clk is again transitioned in response to the internal data enable clock DE, a frequency of the reference clock REF_clk in Phase 3 may be two times a frequency of the reference clock REF restored in Phase 1 and Phase 2. As above, if the frequency of the reference clock REF_clk of the clock separation and data sampling unit 21 increases, an output of the PLL 64 can be further stabilized because the number of stages inside the VCO of the PLL 64 may decrease. More specifically, if the reference clock REF_clk of the PLL 64 transitions in the middle of the RGB data packet in response to the internal data enable clock DE to increase the frequency of the reference clock REF_clk of the PLL 64 by two times, the number of stages inside the VCO of the PLL 64 may decrease to ½. If the internal data enable clock DE does not use the reference clock REF_clk as a transition clock, 34 VCO stages are necessary. On the other hand, if the internal data enable clock DE uses the reference clock REF_clk as a transition clock, 17 VCO stages are necessary. If the number of VCO stages in the PLL 64 increases, an effect resulting from changes in a process, a voltage, and a temperature PVT is represented by a multiplication of an increase width in the number of VCO stages. Therefore, the locking of the PLL 64 may be released because of such an external change. Accordingly, the embodiment of the invention uses the internal data enable clock DE in addition to the clock CLK as the transition clock and thus can increase the frequency of the reference clock REF_clk of the PLL. Hence, locking reliability of the PLL 64 can be improved.

The RGB data packet and the source control packets Cf, Cr, Cb, and Cl may be distinguished from each other by setting predetermined bit values differently from each other. FIG. 14 illustrates a data mapping table of the source control packets Cf, Cr, Cb, and Cl generated in Phase 2 and the RGB data packet generated in Phase 3. However, the data mapping table according to the embodiment of the invention is not limited to the data mapping table shown in FIG. 14 and may be variously modified based on the data mapping table shown in FIG. 14.

As shown in FIG. 14, if each of R data, G data, and B data is 10-bit data, the RGB data packet includes a total of 34-bit. More specifically, the RGB data packet includes 1-bit clock, 10-bit R data [0:9], 5-bit G data [0:4], 1-bit dummy enable clock DE DUM, 1-bit data enable clock DE, 5-bit G data [5:9], and 10-bit B data [0:9]. The source control packets Cf, Cr, and Cb have a data length (i.e., 34-bit) equal to a data length of the RGB data packet. More specifically, each of the source control packets Cf, Cr, and Cb includes 1-bit clock, 15-bit first control data replacing R data [0:9] and G data [0:4], 1-bit dummy data enable clock DE DUM, 1-bit data enable clock DE, and 15-bit second control data replacing G data [5:9] and B data [0:9]. The RGB data packet and the source control packets Cf, Cr, and Cb may be distinguished from each other by setting a bit value of the dummy data enable clock DE DUM and a bit value of the data enable clock DE differently from each other.

The dummy source control packets Cf, Cb, and Cl and the real source control packet Cr may be distinguished from each other by predetermined bits determined by the first control data and the second control data of FIG. 14. FIG. 15 illustrates an example of a data mapping table of the source control packets. However, the data mapping table according to the embodiment of the invention is not limited to the data mapping table shown in FIG. 15 and may be variously modified based on the data mapping table shown in FIG. 15.

FIG. 15 illustrates a data mapping table of the source control packets Cf, Cr, Cb, and Cl.

As shown in FIG. 15, in the dummy source control packets Cf, Cb, and Cl, a high logic level H, a low logic level L, a low logic level L, and a low logic level L are respectively assigned to 4 bits C0 to C3. On the other hand, in the real source control packet Cr, a high logic level H, a high logic level H, a high logic level H, and a low logic level L are respectively assigned to 4 bits C0 to C3. Accordingly, the dummy source control packets Cf, Cb, and Cl and the real source control packet Cr may be distinguished by bit values of C1 and C2.

The last dummy source control packet Cl indicating a transfer of the RGB data packet may be distinguished from the dummy source control packets Cf and Cb by 2 bits C16 and C17. The clock separation and data sampling unit 21 of each of the source drive ICs SDIC#1 to SDIC#8 reads 2 bits C16 and C17 of the last dummy source control packet Cl and thus may predict that the RGB data packet will be input subsequent to the last dummy source control packet Cl. More specifically, first identification informations C1 and C2 and second identification informations C16 and C17 are encoded to each of the dummy source control packets Cf, Cb, and Cl and the real source control packet Cr. A logic level of first identification informations C1 and C2 encoded to the real source control packet Cr is set to be different from a logic level of first identification informations C1 and C2 encoded to each of the dummy source control packets Cf, Cb, and Cl. Further, a logic level of second identification informations C16 and C17 encoded to the last dummy source control packet Cl is set to be different from a logic level of second identification informations C16 and C17 encoded to each of the source control packets Cf, Cb, and Cr. Each of the source drive ICs SDIC#1 to SDIC#8 may confirm whether or not the real source control packet Cr is input depending on the logic level of the first identification informations C1 and C2 and may predict an input of the RGB data packet depending on the logic level of the second identification informations C16 and C17.

Figure 17:
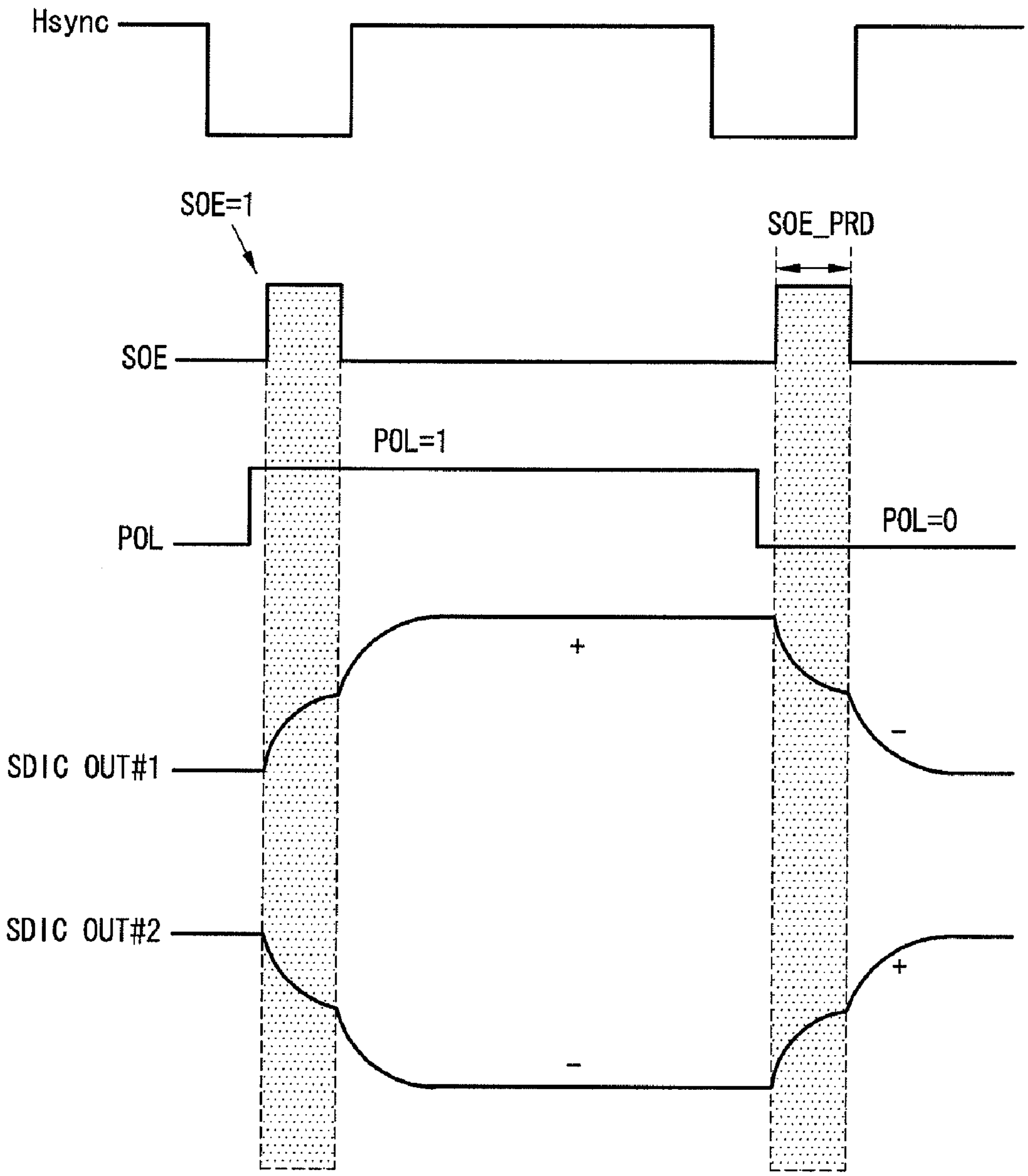
FIG. 17 is a waveform diagram illustrating a source output enable signal controlled by source output-related control data and a polarity control signal controlled by polarity-related control data in a real source control packet of FIG. 16.

FIG. 16 illustrates a data mapping table of the real source control packet Cr. FIG. 17 is a waveform diagram illustrating the source output enable signal SOE controlled depending on bits C1 and C2 and the polarity control signal POL controlled depending on bits C13 and C14 in the real source control packet Cr illustrated in FIG. 16.

As shown in FIGS. 16 and 17, the real source control packet Cr includes 'SOE' of bits C1 and C2 and 'POL' of C13 and C14.

When the SOE&POL restoring unit 74 detects bits C1 and C2 of a real source control packet Cr having a first logic value (H/H), the SOE&POL restoring unit 74 generates the source output enable signal SOE of a high logic level and keeps the source output enable signal SOE at a high logic level for a predetermined period of time. Then, the SOE&POL restoring unit 74 reads bits C1 and C2 of another real source control packet Cr. When bits C1 and C2 of another real source control packet Cr are detected as a second logic value (H/L), the SOE&POL restoring unit 74 inverts a logic level of the source output enable signal SOE to a low logic level. Accordingly, a pulse width of the source output enable signal SOE may be automatically adjusted depending on bits C1 and C2 of the real source control packet Cr. The pulse width of the source output enable signal SOE may be adjusted depending on a length of the source control packet as illustrated in FIGS. 18A to 18C.

Figure 18A:
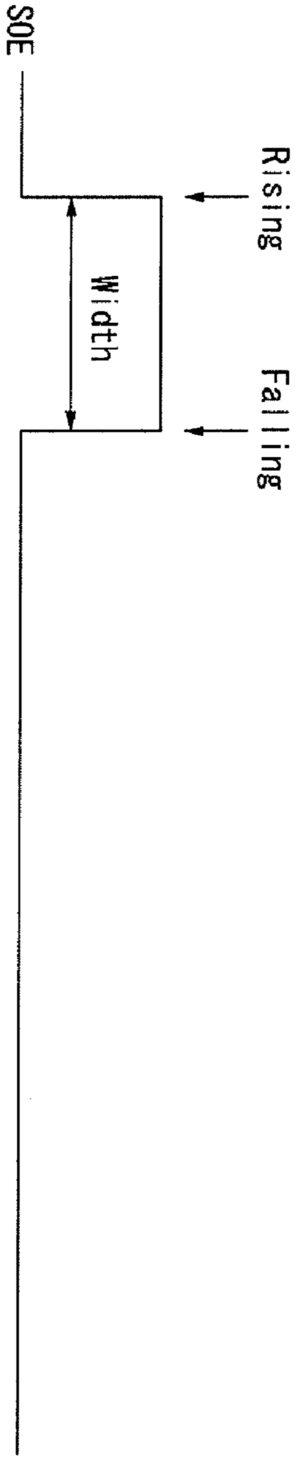
FIGS. 18A to 18C illustrate a pulse width of a source output enable signal controlled depending on source output-related control data of a real source control packet.

In an example illustrated in FIG. 18A, bits C1 and C2 of a first real source control packet Cr may include a rising time information HH of the source output enable signal SOE, and bits C1 and C2 of a fourth real source control packet Cr may include a falling time information HL of the source output enable signal SOE. The SOE&POL restoring unit 74 generates the source output enable signal SOE of a high logic level in response to a first restoring clock SCLK#1 and keeps the source output enable signal SOE at a high logic level for a predetermined period of time from a generation time point of the first restoring clock SCLK#1 to immediately before a generation of a fourth restoring clock SCLK#4. Then, when the SOE&POL restoring unit 74 detects the falling time information HL in response to the fourth restoring clock SCLK#4, the SOE&POL restoring unit 74 inverts a logic level of the source output enable signal SOE to a low logic level. Accordingly, the SOE&POL restoring unit 74 may restore the source output enable signal SOE having a pulse width corresponding to (4× source control packet length or RGB data packet length).

Figure 18B:
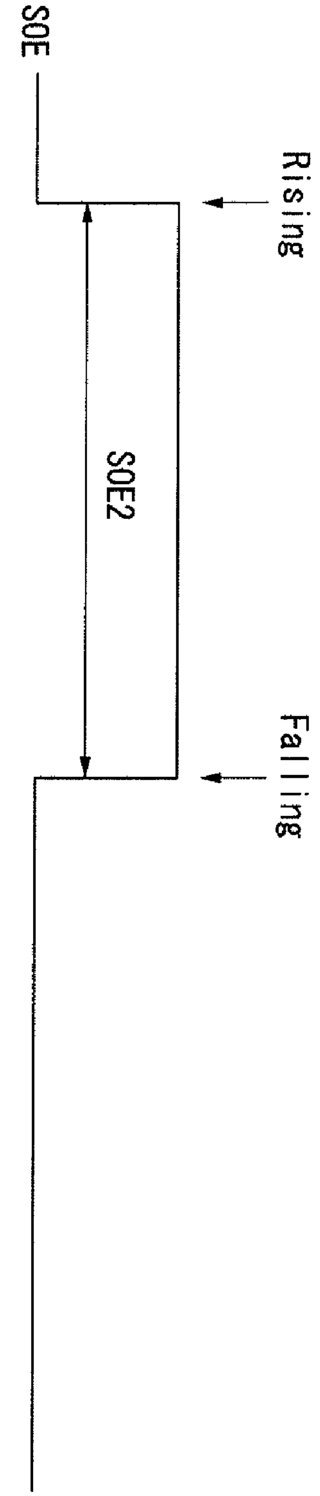

In an example illustrated in FIG. 18B, bits C1 and C2 of a first real source control packet Cr may include a rising time information HH of the source output enable signal SOE, and bits C1 and C2 of an eighth real source control packet Cr may include a falling time information HL of the source output enable signal SOE. The SOE&POL restoring unit 74 generates the source output enable signal SOE of a high logic level in response to a first restoring clock SCLK#1 and keeps the source output enable signal SOE at a high logic level for a predetermined period of time from a generation time point of the first restoring clock SCLK#1 to immediately before a generation of an eighth restoring clock SCLK#8. Then, when the SOE&POL restoring unit 74 detects the falling time information HL in response to the eighth restoring clock SCLK#8, the SOE&POL restoring unit 74 inverts a logic level of the source output enable signal SOE to a low logic level. Accordingly, the SOE&POL restoring unit 74 may restore the source output enable signal SOE having a pulse width corresponding to (8× source control packet length or RGB data packet length).

Figure 18C:
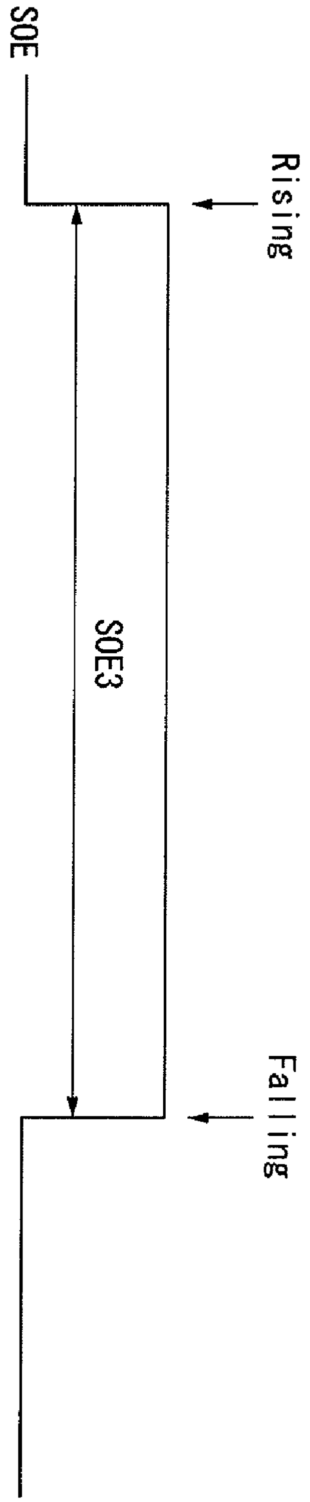

In an example illustrated in FIG. 18C, bits C1 and C2 of a first real source control packet Cr may include a rising time information HH of the source output enable signal SOE, and bits C1 and C2 of a twelfth real source control packet Cr may include a falling time information HL of the source output enable signal SOE. The SOE&POL restoring unit 74 generates the source output enable signal SOE of a high logic level in response to a first restoring clock SCLK#1 and keeps the source output enable signal SOE at a high logic level for a predetermined period of time from a generation time point of the first restoring clock SCLK#1 to immediately before a generation of a twelfth restoring clock SCLK#12. Then, when the SOE&POL restoring unit 74 detects the falling time information HL in response to the twelfth restoring clock SCLK#12, the SOE&POL restoring unit 74 inverts a logic level of the source output enable signal SOE to a low logic level. Accordingly, the SOE&POL restoring unit 74 may restore the source output enable signal SOE having a pulse width corresponding to (12× source control packet length or RGB data packet length).

As shown in FIG. 16, the SOE&POL restoring unit 74 detects bits C13 and C14 of the real source control packet Cr to generate the polarity control signal POL. Then, after the SOE&POL restoring unit 74 keeps the polarity control signal POL at the same logic level during "i" horizontal periods, the SOE&POL restoring unit 74 inverts the polarity control signal POL. For example, the SOE&POL restoring unit 74 detects bits C13 and C14 of the real source control packet Cr to generate the polarity control signal POL and keeps the polarity control signal POL at a high logic level during 1 or 2 horizontal periods. Then, the SOE&POL restoring unit 74 inverts the polarity control signal POL to keep the polarity control signal POL at a low logic level during 1 or 2 horizontal periods. In other words, the SOE&POL restoring unit 74 may invert a logic level of the polarity control signal POL every 1 or 2 horizontal periods.

Figure 19:
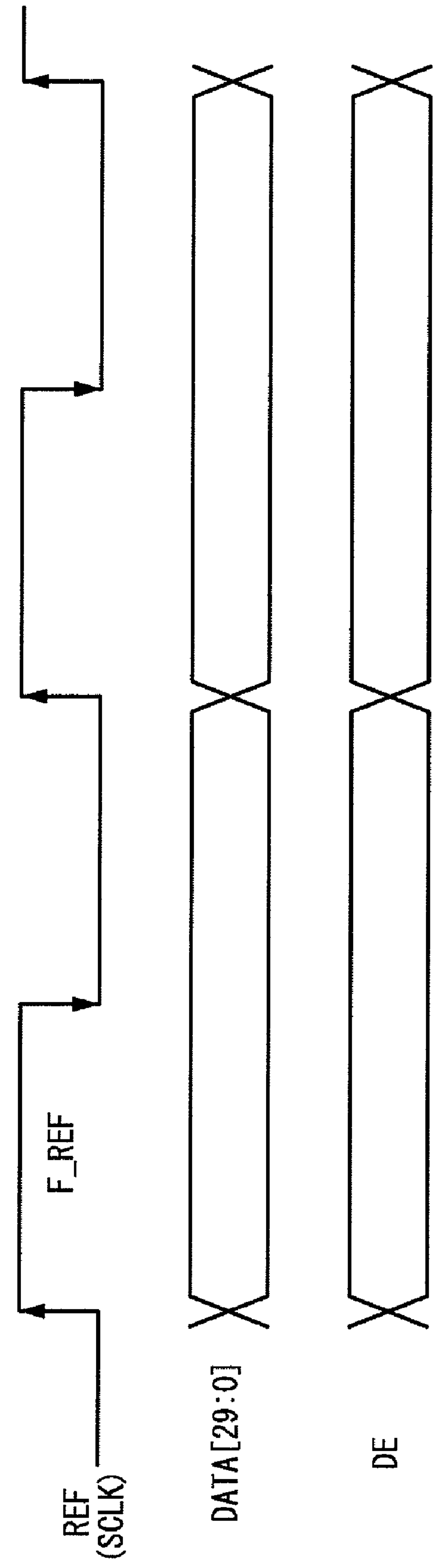
FIG. 19 is a waveform diagram illustrating an output of a clock separation and data sampling unit.

FIG. 19 is a waveform diagram illustrating an output of the clock separation and data sampling unit 21 when each of R data, G data, and B data is 10-bit data.

In the liquid crystal display and the method of driving the same according to the embodiment of the invention, the RGB data packet and the control data packet are not limited to the data length illustrated in FIGS. 10 to 16 and their length conversion is possible depending on a bit rate of an input image as illustrated in FIGS. 20A to 20D.

Figure 20A:
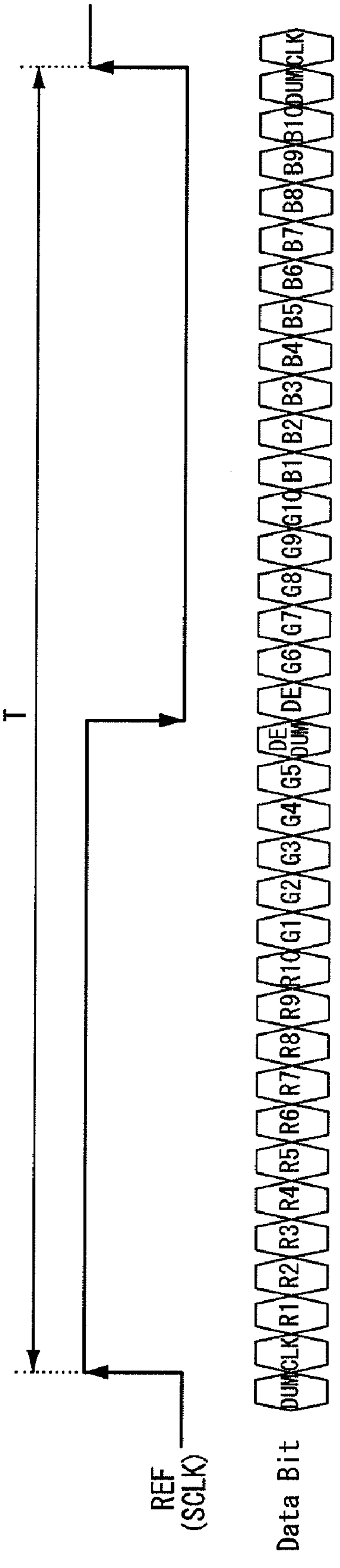
FIGS. 20A to 20D are cross-sectional views illustrating a length conversion of an RGB data packet depending on changes in a bit rate of the RGB data packet.

When each of R data, G data, and B data is 10-bit data, as shown in FIG. 20A, the timing controller TCON generates 1 source control packet or 1 RGB data packet as a bit stream including DUM, CLK, R1 to R10, G1 to G5, DE DUM, DE, G6 to G10, and B1 to B10 for T hours. The clock separation and data sampling unit 21 of each of the source drive ICs SDIC#1 to SDIC#8 generates 34 edge clocks and 34 center clocks from the 1 source control/RGB data packet received from the timing controller TCON and samples source control bits or RGB data bits in conformity with the center clocks.

Figure 20B:
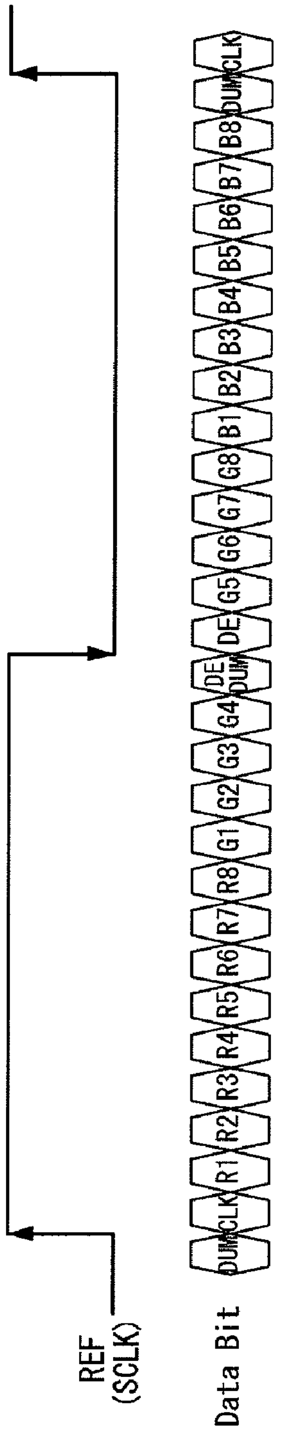

When each of R data, G data, and B data is 8-bit data, as shown in FIG. 20B, the timing controller TCON generates 1 source control/RGB data packet as a bit stream including DUM, CLK, R1 to R8, G1 to G4, DE DUM, DE, G5 to G8, and B1 to B8 for T×(28/34) hours. The clock separation and data sampling unit 21 of each of the source drive ICs SDIC#1 to SDIC#8 generates 28 edge clocks and 28 center clocks from the 1 source control/RGB data packet received from the timing controller TCON and samples source control bits or RGB data bits in conformity with the center clocks.

Figure 20C:
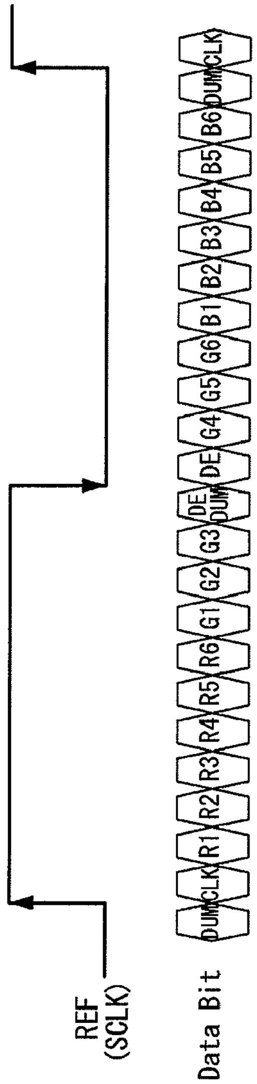

When each of R data, G data, and B data is 6-bit data, as shown in FIG. 20C, the timing controller TCON generates 1 source control/RGB data packet as a bit stream including DUM, CLK, R1 to R6, G1 to G3, DE DUM, DE, G4 to G6, and B1 to B6 for T×(22/34) hours. The clock separation and data sampling unit 21 of each of the source drive ICs SDIC#1 to SDIC#8 generates 22 edge clocks and 22 center clocks from the 1 source control/RGB data packet received from the timing controller TCON and samples source control bits or RGB data bits in conformity with the center clocks.

Figure 20D:
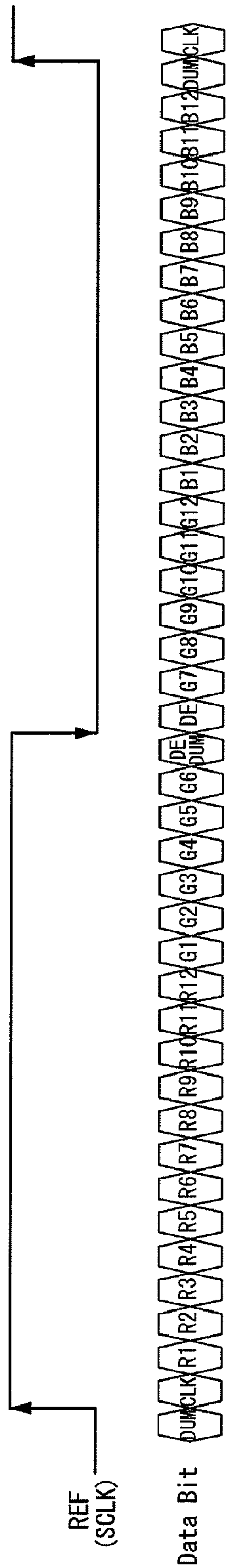

When each of R data, G data, and B data is 12-bit data, as shown in FIG. 20D, the timing controller TCON generates 1 source control/RGB data packet as a bit stream including DUM, CLK, R1 to R12, G1 to G6, DE DUM, DE, G7 to G12, and B1 to B12 for T×(40/34) hours. The clock separation and data sampling unit 21 of each of the source drive ICs SDIC#1 to SDIC#8 generates 40 edge clocks and 40 center clocks from the 1 source control/RGB data packet received from the timing controller TCON and samples source control bits or RGB data bits in conformity with the center clocks.

The timing controller TCON decides a bit rate of input data and may automatically convert the length of the source control/RGB data packet as illustrated in FIGS. 20A to 20D.

A liquid crystal display according to another embodiment of the invention generates a preamble signal including a plurality of pulse groups each having a different pulse width and a different cycle as Phase 1 signals and thus may more securely lock a phase and a frequency of internal clock pulses output from the PLL of the clock separation and data sampling unit 21.

Figure 21:
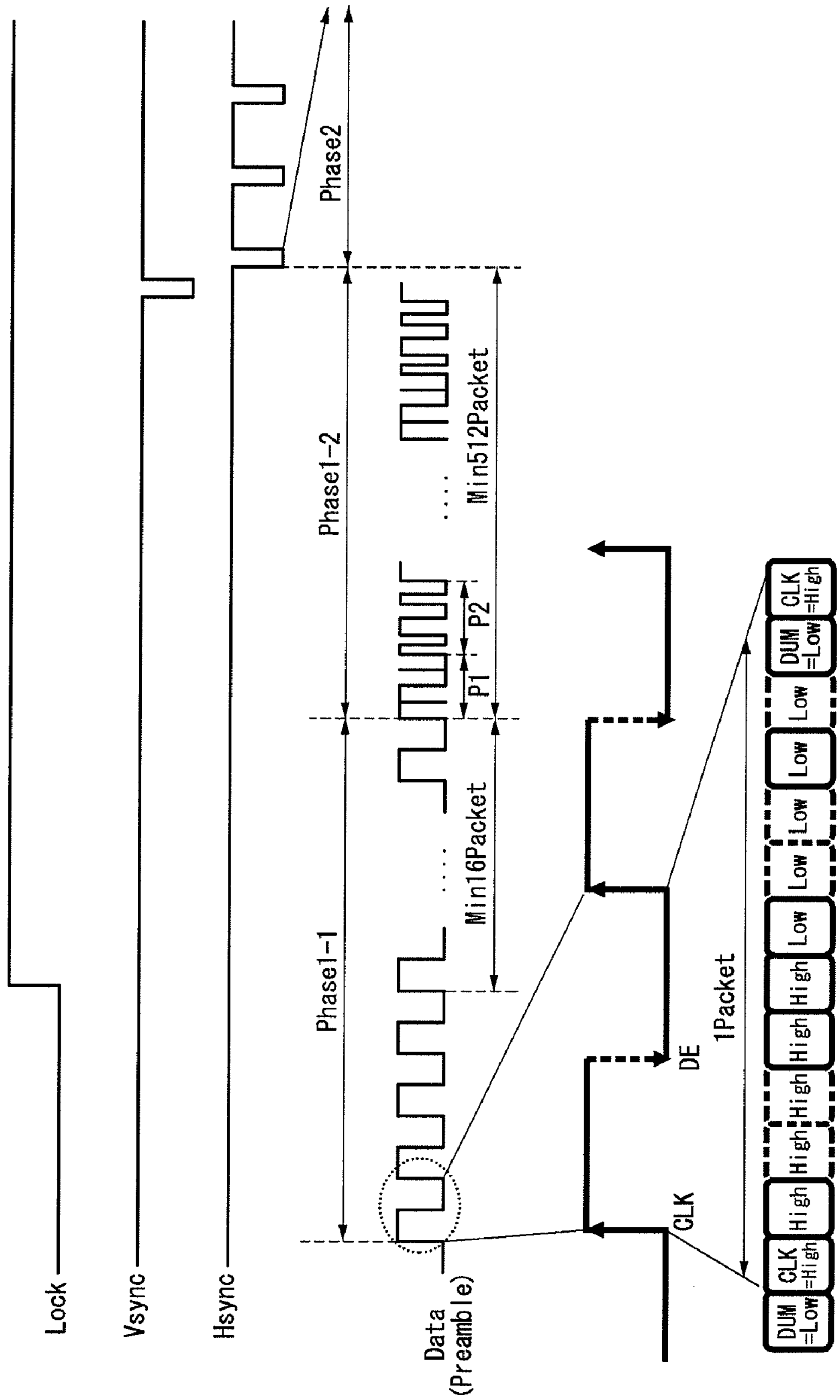
FIGS. 21 and 22 are waveform diagrams illustrating Phase 1 signals according to another embodiment of the invention.
Figure 22:
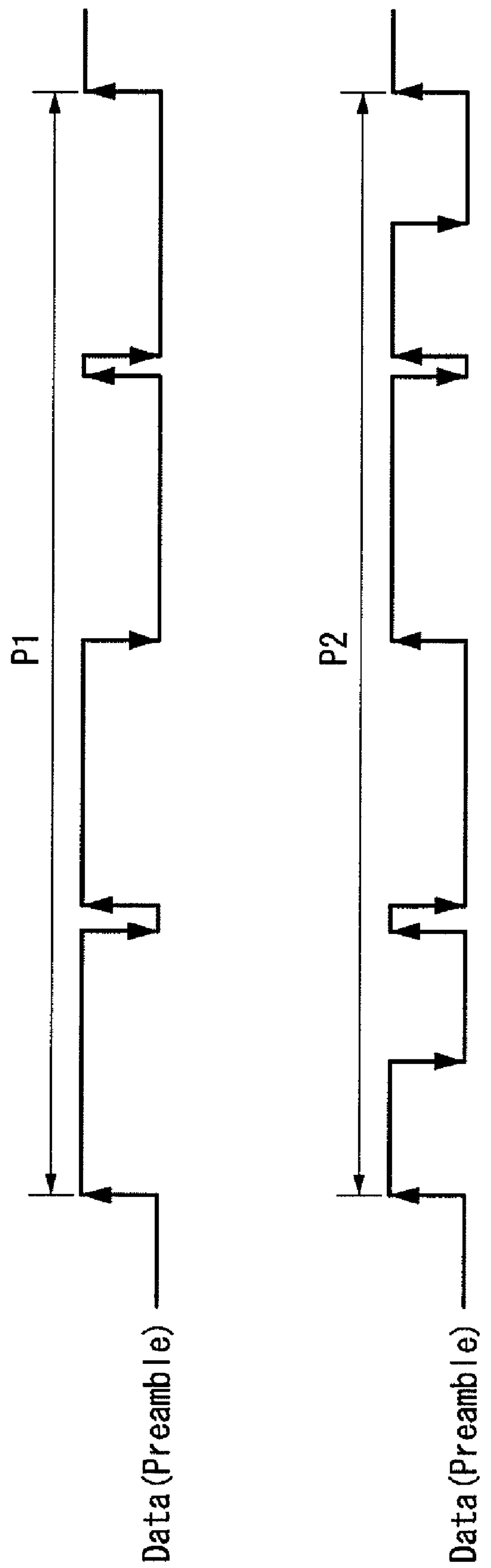

FIGS. 21 and 22 are waveform diagrams illustrating Phase 1 signals according to another embodiment of the invention.

As shown in FIGS. 21 and 22, Phase 1 signals include a phase 1-1 signal and a phase 1-2 signal. The phase 1-1 signal is a signal whose 1 cycle is set at the same time as 1 source control/RGB data packet in the same manner as the above-described preamble signal. A frequency of the phase 1-2 signal is greater than a frequency of the phase 1-1 signal, and a cycle of the phase 1-2 signal is equal to or less than ½ of a cycle of the phase 1-1 signal. The phase 1-2 signal may have a waveform in which two pulse groups P1 and P2 each having a different phase and a different frequency are alternately generated. A frequency of the first pulse group P1 is equal to or greater than two times a frequency of a pulse row generated in the form of the phase 1-1 signal, and a frequency of the second pulse group P2 is equal to or greater than two times the frequency of the first pulse group P1. As shown in FIGS. 21 and 22, while the PLL 64 of the clock separation and data sampling unit 21 tracks pulses whose a frequency is greater than the frequency of the phase 1-1 signal and a phase regularly changes, the clock separation and data sampling unit 21 can more stably and more rapidly lock a phase and a frequency of internal clock pulses than the preamble signal of the low frequency illustrated in FIG. 10.

As consumers have demanded operation improvement of LCD modules, LCD module makers may provide the source drive ICs SDIC#1 to SDIC#8 with various options so that the consumers may directly control detailed operations of the LCD modules. For this, in the related art, the makers provided the source drive ICs SDIC#1 to SDIC#8 with a plurality of option pins and connected pull-up resistors or pull-down resistors to the option pins of the source drive ICs SDIC#1 to SDIC#8 whenever necessary. Further, in the related art, option operations of the source drive ICs SDIC#1 to SDIC#8 were controlled by applying a power source voltage Vcc or a ground level voltage GND to the LCD module. However, in the related art, the chip size of the source drive ICs SDIC#1 to SDIC#8 increased because of the plurality of option pins, and also the PCB size increased because of pull-up/pull-down resistors connected to the option pins and lines.

A liquid crystal display according to another embodiment of the invention may further reduce the chip size of the source drive ICs SDIC#1 to SDIC#8 and the PCB size by adding signals for controlling various operations of the source drive ICs SDIC#1 to SDIC#8 during a predetermined period of Phase 2. For this, the liquid crystal display according to the embodiment of the invention generates control option information for controlling various operations of the source drive ICs SDIC#1 to SDIC#8, such as PWRC1/2, MODE, SOE_EN, PACK_EN, CHMODE, CID1/2, H_2DOT, as a separate source control packet. The source control packet including the control option information may be inserted into a predetermined period of Phase 2 and may be transferred to the source drive ICs SDIC#1 to SDIC#8 through the pairs of data bus lines.

PWRC1/2 is option information determining an amplification ratio of an output buffer of the source drive ICs SDIC#1 to SDIC#8 to select a power capacitance of the source drive ICs SDIC#1 to SDIC#8, as indicated in the following Table 1.

TABLE 1

| | |
|---|---|
| PWRC1/2 = 11 (HH) | High Power Mode |
| PWRC1/2 = 10 (HL) | Normal Power Mode |
| PWRC1/2 = 01 (LH) | Low Power Mode |
| PWRC1/2 = 00 (LL) | Ultra Low Power Mode |

MODE is option information determining whether to enable or disable an output of a charge share voltage during a high logic level period of the source output enable signal SOE, as indicated in the following Table 2.

TABLE 2

| | |
|---|---|
| MODE = 1 (H) | Hi_Z Mode Operation (charge share output disable) |
| MODE = 0 (L) | Charge-share mode operation (Charge share output enable |

SOE_EN is option information determining whether to receive the source output enable signal SOE in the form embedded in the RGB digital video data or through separate lines from the source drive ICs SDIC#1 to SDIC#8, as indicated in the following Table 3.

TABLE 3

| | PACK_EN = 0 (L) | PACK_EN = 1 (H) |
|---|---|---|
| SOE_EN = 0 (L) | Forbidden | Use internal SOE |
| SOE_EN = 1 (H) | Use external SOE | |

PACK_EN is option information determining whether to receive the polarity control signal POL and the gate start pulse GSP to be transferred to the gate drive ICs GDIC#1 to GDIC#4 in the form embedded in the RGB digital video data or through separate lines from the source drive ICs SDIC#1 to SDIC#8, as indicated in the following Table 4.

TABLE 4

| | |
|---|---|
| PACK_EN = 1 (H) | Enable control packet |
| PACK_EN = 0 (L) | Disable control packet (Ignore the value of SOE_EN) |

CHMODE is option information determining the number of output channels of the source drive ICs SDIC#1 to SDIC#8 in conformity with a resolution of the liquid crystal display, as indicated in the following Table 5.

TABLE 5

| | |
|---|---|
| CHMODE = 1 (H) | 690 Ch. Outputs (691~720 Ch. Disable) |
| CHMODE = 0 (L) | 720 Ch. Outputs |

CID1/2 is option information giving a chip identification code CID to each of the source drive ICs SDIC#1 to SDIC#8 to independently control the source drive ICs SDIC#1 to SDIC#8, as indicated in the following Table 6. A bit rate of CID1/2 may be adjusted depending on the number of source drive ICs. Further, as described above, the source drive ICs SDIC#1 to SDIC#8 may be individually controlled through $I^2C$ communication using the timing control TCON and the pair of control lines SCL/SDA. The LCD module makers may select among the control method using option information CID1/2 and the control method using through $I^2C$ communication.

TABLE 6

| | |
|---|---|
| CID1/2 = 00 (LL) | Assigning to SDIC#1 |
| CID1/2 = 01 (LH) | Assigning to SDIC#2 |
| CID1/2 = 10 (HL) | Assigning to SDIC#3 |
| CID1/2 = 11 (HH) | Assigning to SDIC#4 |

H_2DOT is option information controlling a horizontal polarity cycle of the positive/negative analog video data voltage output from the source drive ICs SDIC#1 to SDIC#8, as indicated in the following Table 7. For example, if a bit value of H_2DOT is "1 (H)", the source drive ICs SDIC#1 to SDIC#8 control a polarity of the data voltage in a horizontal 2-dot inversion manner. In the horizontal 2-dot inversion manner, the source drive ICs SDIC#1 to SDIC#8 output the data voltages of the same polarity to the two adjacent data lines. Namely, a polarity of the data voltage is inverted every the two adjacent data lines in the horizontal 2-dot inversion manner. Hence, the polarities of the data voltages to which the horizontally adjacent liquid crystal cells are charged are controlled as follows: "−++−, . . . , +−−+(or +−−+, . . . , −++−)". Further, if a bit value of H_2DOT is "0 (L)", the source drive ICs SDIC#1 to SDIC#8 control a polarity of the data voltage in a horizontal 1-dot inversion manner. In the horizontal 1-dot inversion manner, the source drive ICs SDIC#1 to SDIC#8 invert a polarity of the data voltage supplied to the adjacent data lines every 1 data line. Hence, the polarities of the data voltages to which the horizontally adjacent liquid crystal cells are charged are controlled as follows: "−+−+, . . . , +−+−(or +−+−, . . . , −+−+)".

TABLE 7

| | |
|---|---|
| H_2DOT = 1 (H) | Horizontal 2-Dot inversion Enable |
| H_2DOT = 0 (L) | Horizontal 2-Dot inversion Disable |

In the embodiments of the invention, the timing controller TCON has to receive a feedback lock signal of a high logic level from the last source drive IC SDIC#8, so that the timing controller TCON proceeds to Phase 2. More specifically, if PLL locking operations of all of the source drive ICs SDIC#1 to SDIC#8 are not completed, the timing controller TCON repeatedly generates only the preamble signal of Phase 1, and the source drive ICs SDIC#1 to SDIC#8 do not output the data voltage. Accordingly, if the timing controller TCON does not receive the feedback lock signal, an individual driving state of the source drive ICs SDIC#1 to SDIC#8 cannot be confirmed. However, a defective source drive IC among the source drive ICs SDIC#1 to SDIC#8 needs to be confirmed, and also a driving state of each of the source drive ICs SDIC#1 to SDIC#8 needs to be confirmed.

In the embodiments of the invention, the locking check process includes sequentially performing a PLL locking check process on the source drive ICs SDIC#1 to SDIC#8 in response to the Phase 1 signals generated by the timing controller TCON to feedback-input the lock signal of a high logic level to the timing controller TCON. On the contrary, time required in the PLL locking check process of the source drive ICs SDIC#1 to SDIC#8 can be further reduced using comparators 231 and 241 shown in FIGS. 23 and 24, and also locking or unlocking of the source drive ICs SDIC#1 to SDIC#8 can be more securely confirmed using the comparators 231 and 241.

Figure 23:
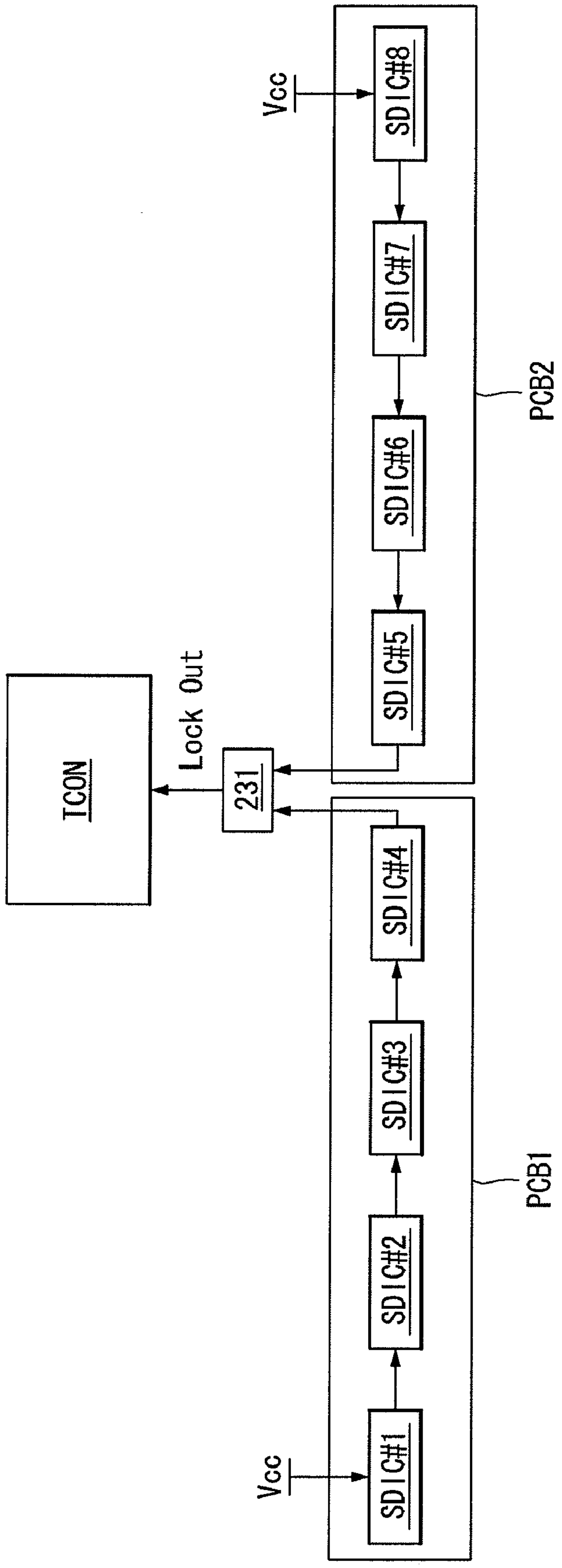
FIGS. 23 and 24 illustrate an example of a PLL locking check of source drive ICs using a comparator in a liquid crystal display according to another embodiment of the invention.
Figure 24:
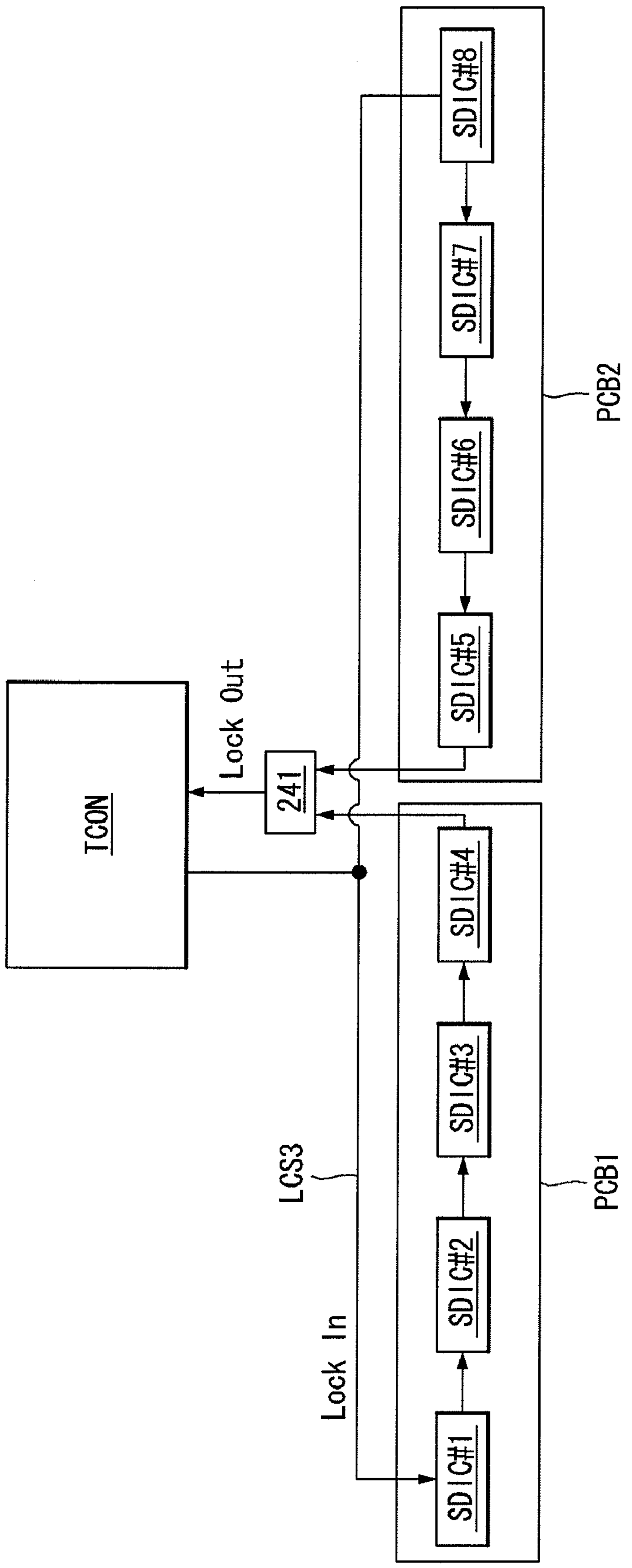

FIGS. 23 and 24 illustrate an example of a PLL locking check of source drive ICs using the comparators 231 and 241 in a liquid crystal display according to another embodiment of the invention.

As shown in FIG. 23, a first source drive IC group including the source drive ICs SDIC#1 to SDIC#4 mounted on a first PCB PCB1 outputs a first feedback lock signal in response to a power voltage Vcc of 3.3 V (or a power voltage Vcc of a high logic level) input through a first lock signal input terminal. A second source drive IC group including the source drive ICs SDIC#5 to SDIC#8 mounted on a second PCB PCB2 outputs a second feedback lock signal in response to the power voltage Vcc input through a second lock signal input terminal. The comparator 231 compares the first feedback lock signal with the second feedback lock signal and supplies a comparison result to the timing controller TCON.

The power voltage Vcc is supplied to a lock signal input terminal of each of the source drive ICs SDIC#1 to SDIC#8. Input terminals of the comparator 231 are connected to lock check output terminals of the fourth and fifth source drive ICs SDIC#4 and SDIC#5, and an output terminal of the comparator 231 is connected to a lock check feedback input terminal of the timing controller TCON. After a power is applied to the liquid crystal display, the power voltage Vcc is continuously supplied to a digital circuit such as the timing controller TCON, the source drive ICs SDIC#1 to SDIC#8, and the gate drive ICs GDIC#1 to GDIC#4 as a DC power. Accordingly, the timing controller TCON may confirm a locking or unlocking operation of all the source drive ICs SDIC#1 to SDIC#8 through only an output of the comparator 231.

After the first source drive IC SDIC#1 locks a frequency and a phase of internal clock pulses output from the PLL of the first source drive IC SDIC#1, the first source drive IC SDIC#1 transfers a lock signal to the second source drive IC SDIC#2. At the same time, after the eighth source drive IC SDIC#8 locks a frequency and a phase of internal clock pulses output from the PLL of the eighth source drive IC SDIC#8, the eighth source drive IC SDIC#8 transfers a lock signal to the seventh source drive IC SDIC#7. After the second source drive IC SDIC#2 locks a frequency and a phase of internal clock pulses output from the PLL of the second source drive IC SDIC#2, the second source drive IC SDIC#2 transfers a lock signal to the third source drive IC SDIC#3. After the third source drive IC SDIC#3 locks a frequency and a phase of internal clock pulses output from the PLL of the third source drive IC SDIC#3, the third source drive IC SDIC#3 transfers a lock signal to the fourth source drive IC SDIC#4. After the seventh source drive IC SDIC#7 locks a frequency and a phase of internal clock pulses output from the PLL of the seventh source drive IC SDIC#7, the seventh source drive IC SDIC#7 transfers a lock signal to the sixth source drive IC SDIC#6. After the sixth source drive IC SDIC#6 locks a frequency and a phase of internal clock pulses output from the PLL of the sixth source drive IC SDIC#6, the sixth source drive IC SDIC#6 transfers a lock signal to the fifth source drive IC SDIC#5.

The comparator 231 compares the first and second lock signals transferred to the fourth and fifth source drive ICs SDIC#4 and SDIC#5 and supplies an output signal of a high logic level to the timing controller TCON when feedback signals of the first and second lock signals are a high logic level. The comparator 231 may be implemented as a AND gate. When the timing controller TCON receives the lock signal of a high logic level from the comparator 231, the timing controller TCON starts transferring Phase 2 and 3 signals.

As shown in FIG. 24, a first source drive IC group including the source drive ICs SDIC#1 to SDIC#4 mounted on a first PCB PCB1 outputs a first feedback lock signal in response to a lock signal Lock In input through a lock check line LCS3 and a first lock signal input terminal. A second source drive IC group including the source drive ICs SDIC#5 to SDIC#8 mounted on a second PCB PCB2 outputs a second feedback lock signal in response to the lock signal Lock In input through the lock check line LCS3 and a second lock signal input terminal. The comparator 241 compares the first feedback lock signal with the second feedback lock signal and supplies a comparison result to the timing controller TCON.

In Phase 1, the timing controller TCON simultaneously transfers the lock signal Lock In to lock signal input terminals of the first and eighth source drive ICs SDIC#1 and SDIC#8. Input terminals of the comparator 241 are connected to lock check output terminals of the fourth and fifth source drive ICs SDIC#4 and SDIC#5, and an output terminal of the comparator 241 is connected to a lock check feedback input terminal of the timing controller TCON.

After the first source drive IC SDIC#1 locks a frequency and a phase of internal clock pulses output from the PLL of the first source drive IC SDIC#1, the first source drive IC SDIC#1 transfers a lock signal to the second source drive IC SDIC#2. At the same time, after the eighth source drive IC SDIC#8 locks a frequency and a phase of internal clock pulses output from the PLL of the eighth source drive IC SDIC#8, the eighth source drive IC SDIC#8 transfers a lock signal to the seventh source drive IC SDIC#7. After the second source drive IC SDIC#2 locks a frequency and a phase of internal clock pulses output from the PLL of the second source drive IC SDIC#2, the second source drive IC SDIC#2 transfers a lock signal to the third source drive IC SDIC#3. After the third source drive IC SDIC#3 locks a frequency and a phase of internal clock pulses output from the PLL of the third source drive IC SDIC#3, the third source drive IC SDIC#3 transfers a lock signal to the fourth source drive IC SDIC#4. After the seventh source drive IC SDIC#7 locks a frequency and a phase of internal clock pulses output from the PLL of the seventh source drive IC SDIC#7, the seventh source drive IC SDIC#7 transfers a lock signal to the sixth source drive IC SDIC#6. After the sixth source drive IC SDIC#6 locks a frequency and a phase of internal clock pulses output from the PLL of the sixth source drive IC SDIC#6, the sixth source drive IC SDIC#6 transfers a lock signal to the fifth source drive IC SDIC#5.

The comparator 241 compares first and second lock signals transferred to the fourth and fifth source drive ICs SDIC#4 and SDIC#5 and supplies an output signal of a high logic level to the timing controller TCON when feedback signals of the first and second lock signals are a high logic level. The comparator 241 may be implemented as a AND gate. When the timing controller TCON receives the lock signal of a high logic level from the comparator 241, the timing controller TCON starts transferring Phase 2 and 3 signals.

A liquid crystal display according to another embodiment of the invention provides a test mode and inputs a feedback lock signal to the timing controller TCON in the test mode to induce an output of the data voltage of the source drive ICs SDIC#1 to SDIC#8, so as to confirm an individual driving state of the source drive ICs SDIC#1 to SDIC#8. For this, in the liquid crystal display according to the embodiment of the invention, as shown in FIG. 25, a selection unit SEL is additionally installed inside or outside the timing controller TCON.

Figure 25:
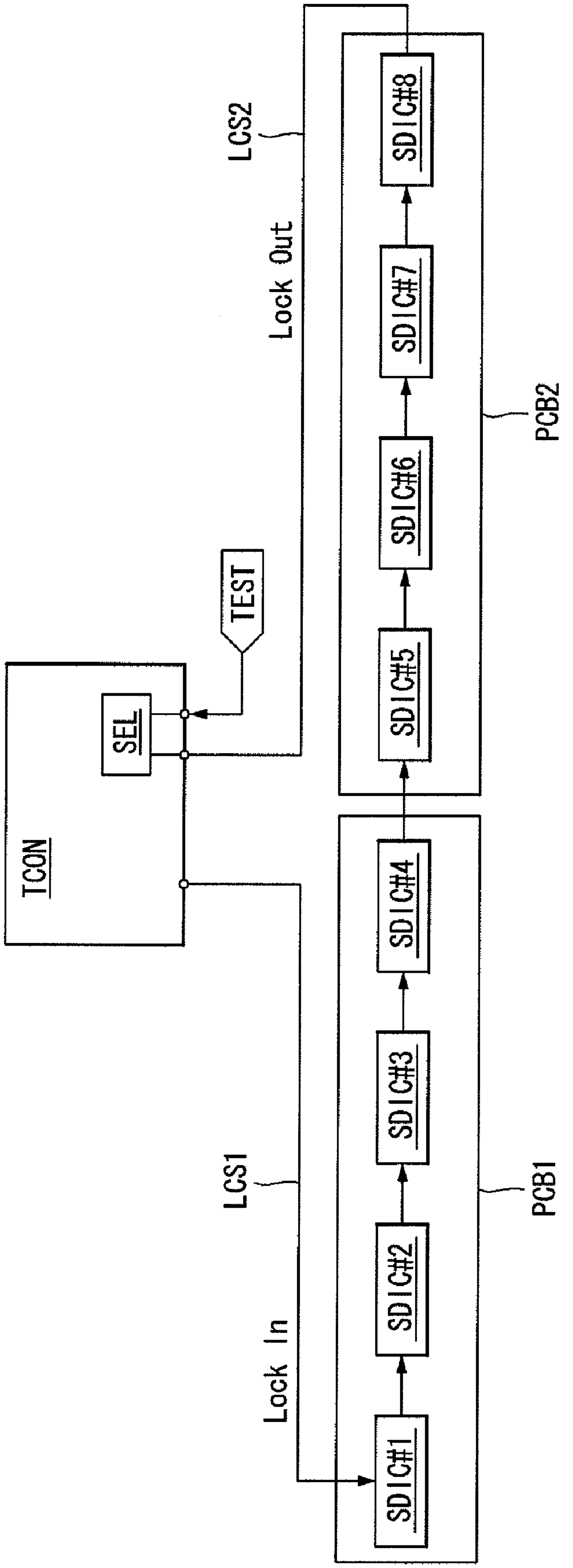
FIG. 25 illustrates an additional configuration of a liquid crystal display according to embodiments of the invention for a test mode.

As shown in FIG. 25, a first input terminal of the selection unit SEL is connected to the feedback lock check line LCS2, and a second input terminal of the selection unit SEL is connected to an input terminal of a test mode enable signal TEST. The selection unit SEL may be implemented as an OR gate outputting at least one of a feedback lock signal "Lock Out" and the test mode enable signal TEST. Even if the feedback lock signal "Lock Out" of a high logic level is not input to the timing controller TCON, the selection unit SEL inputs the test mode enable signal TEST of a high logic level to a data transfer module of the timing controller TCON if the test mode enable signal TEST of the high logic level is input. Accordingly, even if the timing controller TCON does not receive the feedback lock signal in the test mode, the timing controller TCON may proceed to step S8 of FIG. 6 to transfer Phase 2 signals and Phase 3 signals to the source drive ICs SDIC#1 to SDIC#8. The timing controller TCON codes test data extracting from an internal memory in the test mode to the RGB data packet of Phase 3 and transfers the coded test data to the source drive ICs SDIC#1 to SDIC#8. An operator watches an image of the test data displayed on the liquid crystal display panel in the test mode and may confirm the individual driving state of the source drive ICs SDIC#1 to SDIC#8 and whether or not there is a detective source drive IC among the source drive ICs SDIC#1 to SDIC#8.

In FIGS. 23 and 24, the selection unit SEL outputting at least one of the feedback lock signal "Lock Out" and the test mode enable signal TEST may be connected between the timing controller TCON and the fourth source drive IC SDIC#4 and also may be connected between the timing controller TCON and the fifth source drive IC SDIC#5.

A liquid crystal display according to another embodiment of the invention may transfer the source output enable signal SOE and the polarity control signal POL to the source drive ICs SDIC#1 to SDIC#8 through separate source control data lines without transferring the source control data through the pairs of data bus lines. In this case, after the timing controller TCON confirms a feedback input of the lock signal in Phase 1, the timing controller TCON omits a transfer of Phase 2 signals and starts transferring Phase 3 signals. In other words, immediately after the timing controller TCON confirms that a phase and a frequency of internal clock pulses output from the PLL of each of the source drive ICs SDIC#1 to SDIC#8 are locked, the timing controller TCON may start transferring the RGB data packet.

As described above, in the liquid crystal display and the method of driving the same according to the embodiments of the invention, a clock generating circuit for data sampling is embedded inside each of the source drive ICs, and the source control packet and the RGB data packet are transferred to each of the source drive ICs through the pair of data bus lines. Hence, the number of data transfer lines required between the timing controller and the source drive ICs can be reduced, and source timing control signal lines can be removed. Furthermore, in the liquid crystal display and the method of driving the same according to the embodiments of the invention, the source drive ICs are divided into two groups, and lock signals for checking output clocks of the clock generating circuits are simultaneously transferred to the two groups. Then, the comparator compares the lock signals finally output from the two groups. Hence, a locking check process of the clock generating circuits can be simplified and time required in the locking check process can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:

a timing controller;

a first source drive integrated circuit (IC) group that outputs a first feedback lock signal in response to one of a power voltage input through a first lock signal input terminal and a lock signal from the timing controller;

a second source drive IC group that outputs a second feedback lock signal in response to one of the power voltage input through a second lock signal input terminal, the lock signal from the timing controller, and a lock signal transferred from the first source drive IC group;

N pairs of data bus lines that connect the timing controller to the first and second source drive IC groups in a point-to-point manner, where N is an even number equal to or greater than 2; and a comparator that compares the first feedback lock signal with the second feedback lock signal and supplies a comparison result to the timing controller.

2. The liquid crystal display of claim 1, wherein each of the first and second source drive IC groups includes N/2 source drive ICs.

3. The liquid crystal display of claim 2, wherein the timing controller transfers a preamble signal, in which a plurality of bits having a high logic level are successively arranged and then a plurality of bits having a low logic level are successively arranged, to each of the N source drive ICs of the first and second source drive IC groups through each of the N pairs of data bus lines, wherein if the first and second feedback lock signals are input to the timing controller, the timing controller transfers at least one of source control data and RGB data to each of the N source drive ICs through each of the N pairs of data bus lines.

4. The liquid crystal display of claim 3, wherein the N source drive ICs lock internal clock pulses in response to the preamble signal and then transfer a lock signal to the next source drive IC, wherein each of the N source drive ICs receives at least one of the source control data and the RGB data from the timing controller.

5. The liquid crystal display of claim 4, wherein the first source drive IC group includes:

a first source drive IC that receives the power voltage, restores a reference clock from the preamble signal, and generates a lock signal if a phase of an internal clock pulse output from the first source drive IC is locked based on the reference clock;

a second source drive IC that receives the lock signal from the first source drive IC, restores a reference clock from the preamble signal, and generates a lock signal if a phase of an internal clock pulse output from the second source drive IC is locked based on the reference clock;

a third source drive IC that receives the lock signal from the second source drive IC, restores a reference clock from the preamble signal, and generates a lock signal if a phase of an internal clock pulse output from the third source drive IC is locked based on the reference clock; and a fourth source drive IC that receives the lock signal from the third source drive IC, restores a reference clock from the preamble signal, generates a lock signal if a phase of an internal clock pulse output from the fourth source drive IC is locked based on the reference clock, and supplies the lock signal to a first input terminal of the comparator.

6. The liquid crystal display of claim 5, wherein the second source drive IC group includes:

an eighth source drive IC that receives the power voltage, restores a reference clock from the preamble signal, and generates a lock signal if a phase of an internal clock pulse output from the eighth source drive IC is locked based on the reference clock;

a seventh source drive IC that receives the lock signal from the eighth source drive IC, restores a reference clock from the preamble signal, and generates a lock signal if a phase of an internal clock pulse output from the seventh source drive IC is locked based on the reference clock;

a sixth source drive IC that receives the lock signal from the seventh source drive IC, restores a reference clock from the preamble signal, and generates a lock signal if a phase of an internal clock pulse output from the sixth source drive IC is locked based on the reference clock; and a fifth source drive IC that receives the lock signal from the sixth source drive IC, restores a reference clock from the preamble signal, generates a lock signal if a phase of an internal clock pulse output from the fifth source drive IC is locked based on the reference clock, and supplies the lock signal to a second input terminal of the comparator.

7. The liquid crystal display of claim 3, wherein if the first and second feedback lock signals are input to the timing controller, the timing controller simultaneously transfers at least one source control packet including the source control data to the N source drive ICs through the N pairs of data bus lines and then simultaneously transfers at least one RGB data packet including the RGB data to the N source drive ICs through the N pairs of data bus lines.

8. The liquid crystal display of claim 7, wherein each of the N source drive ICs generates a polarity control signal and a source output enable signal from the source control packet depending on internal clock pulses, restores the RGB data from the RGB data packet, and converts the RGB data into a positive or negative data voltage in response to the polarity control signal to output the positive/negative data voltage in response to the source output enable signal.

9. The liquid crystal display of claim 8, wherein the timing controller supplies a second source control packet to each of the N source drive ICs through each of the N pairs of data bus lines, wherein the second source control packet includes at least one of PWRC1/2 option information determining an amplification ratio of an output buffer of each of the N source drive ICs, MODE option information determining an output of a charge share voltage of each of the N source drive ICs, SOE_EN option information determining a receiving path of the source output enable signal, PACK_EN option information determining a receiving path of the polarity control signal, CHMODE option information determining the number of output channels of the N source drive ICs, CID1/2 option information that gives a chip identification code to each of the N source drive ICs to independently control the N source drive ICs, and H_2DOT option information determining a horizontal polarity cycle of the positive/negative data voltage output from the N source drive ICs.

10. The liquid crystal display of claim 7, wherein the RGB data packet successively includes clock bits, first RGB data bits, internal data enable clock bits, and second RGB data bits in the order named.

11. The liquid crystal display of claim 1, further comprising:

a lock check line used to transfer the lock signal from the timing controller to a first source drive IC of the first source drive IC group and a last source drive IC of the second source drive IC group;

a first feedback lock check line used to supply the first feedback lock signal output from a last source drive IC of the first source drive IC group to the comparator; and a second feedback lock check line used to supply the second feedback lock signal output from a first source drive IC of the second source drive IC group to the comparator.

12. The liquid crystal display of claim 11, wherein the first source drive IC group includes:

a first source drive IC that receives the lock signal from the timing controller, restores a reference clock from the preamble signal, and generates a lock signal if a phase of an internal clock pulse output from the first source drive IC is locked based on the reference clock;

a second source drive IC that receives the lock signal from the first source drive IC, restores a reference clock from the preamble signal, and generates a lock signal if a phase of an internal clock pulse output from the second source drive IC is locked based on the reference clock;

a third source drive IC that receives the lock signal from the second source drive IC, restores a reference clock from the preamble signal, and generates a lock signal if a phase of an internal clock pulse output from the third source drive IC is locked based on the reference clock; and a fourth source drive IC that receives the lock signal from the third source drive IC, restores a reference clock from the preamble signal, generates a lock signal if a phase of an internal clock pulse output from the fourth source drive IC is locked based on the reference clock, and supplies the lock signal to a first input terminal of the comparator.

13. The liquid crystal display of claim 12, wherein the second source drive IC group includes:

an eighth source drive IC that receives the lock signal from the timing controller, restores a reference clock from the preamble signal, and generates a lock signal if a phase of an internal clock pulse output from the eighth source drive IC is locked based on the reference clock;

a seventh source drive IC that receives the lock signal from the eighth source drive IC, restores a reference clock from the preamble signal, and generates a lock signal if a phase of an internal clock pulse output from the seventh source drive IC is locked based on the reference clock;

a sixth source drive IC that receives the lock signal from the seventh source drive IC, restores a reference clock from the preamble signal, and generates a lock signal if a phase of an internal clock pulse output from the sixth source drive IC is locked based on the reference clock; and a fifth source drive IC that receives the lock signal from the sixth source drive IC, restores a reference clock from the preamble signal, generates a lock signal if a phase of an internal clock pulse output from the fifth source drive IC is locked based on the reference clock, and supplies the lock signal to a second input terminal of the comparator.

14. The liquid crystal display of claim 1, wherein the comparator includes an AND gate.

15. A method of driving a liquid crystal display comprising:

supplying one of a power voltage and a lock signal generated from a timing controller to a first source drive integrated circuit (IC) group to generate a first feedback lock signal from the first source drive IC group;

supplying one of the power voltage, the lock signal generated from the timing controller, and a lock signal transferred from the first source drive IC group to a second source drive IC group to generate a second feedback lock signal from the second source drive IC group; and comparing the first feedback lock signal with the second feedback lock signal to supply a comparison result to the timing controller.

16. The method of claim 15, wherein each of the first and second source drive IC groups includes N/2 source drive ICs, where N is an even number equal to or greater than 2.

17. The method of claim 16, further comprising:

generating a preamble signal, in which a plurality of bits having a high logic level are successively arranged and then a plurality of bits having a low logic level are successively arranged, from the timing controller;

transferring the preamble signal to each of the N source drive ICs through each of N pairs of data bus lines connecting the timing controller to the N source drive ICs in a point-to-point manner; and inputting the comparison result to the timing controller to transfer at least one of source control data and RGB data generated from the timing controller to each of the N source drive ICs through each of the N pairs of data bus lines.

* * * * *